(12) United States Patent
Ohba et al.

(10) Patent No.: US 6,464,557 B1
(45) Date of Patent: Oct. 15, 2002

(54) ELASTOMERIC DOLL HEAD, MOLDING METHOD AND MOLD THEREFOR

(75) Inventors: Kazuo Ohba, Saitama; Takahiro Ueno, Chiba; Akira Watanabe, Yamanashi, all of (JP)

(73) Assignee: Takara Co., Ltd., Tokyo (JP)

( * ) Notice: Subject to any disclaimer, the term of this patent is extended or adjusted under 35 U.S.C. 154(b) by 0 days.

(21) Appl. No.: 09/622,943

(22) PCT Filed: Dec. 27, 1999

(86) PCT No.: PCT/JP99/07349

§ 371 (c)(1),
(2), (4) Date: Aug. 24, 2000

(87) PCT Pub. No.: WO00/38810

PCT Pub. Date: Jul. 6, 2000

(30) Foreign Application Priority Data

| Dec. 28, 1998 | (JP) | 10-371834 |
| Feb. 12, 1999 | (JP) | 11-034449 |
| Aug. 24, 1999 | (JP) | 11-237430 |
| Oct. 15, 1999 | (JP) | 11-294558 |
| Oct. 20, 1999 | (JP) | 11-298882 |

(51) Int. Cl.[7] ............................. A63H 3/36
(52) U.S. Cl. ............... 446/391; 264/328.7; 264/328.12; 425/524
(58) Field of Search .................. 264/328.1, 328.7, 264/328.11, 328.12, 299, 319; 425/175, 524, 522; 446/391, 394, 268

(56) References Cited

U.S. PATENT DOCUMENTS

| 2,263,720 A | * | 11/1941 | DeCarlo | 223/66 |
| 4,659,319 A | * | 4/1987 | Blair | 156/58 |
| 4,767,505 A | * | 8/1988 | Satoh et al. | 264/311 |
| 5,596,503 A | * | 1/1997 | Flint | 446/391 |
| 6,099,378 A | * | 8/2000 | George et al. | 446/268 |

* cited by examiner

*Primary Examiner*—Jacob K. Ackun
(74) *Attorney, Agent, or Firm*—Price and Gess

(57) ABSTRACT

A method for forming a safe molding material into an elastic doll head of a uniform thickness without deteriorating an appearance of the doll head. Split mold members (2, 3) each have an inner surface (2a, 3a) formed to have a configuration which provides a shape of a doll head (A) when the split mold members cooperate with each other. The split mold members (2, 3) form the doll head with a parting line (18) in a manner to extend from an upper portion (27) of a forehead of the doll head through a rear side (28) of each of ears thereof to a rear portion (29) of a neck thereof, to thereby substantially equally divide the doll head into two halves. A molding material mainly consisting of a thermoplastic synthetic resin elastomer is heated and dropped in the form of a parison (13) into a space defined between the split mold members (2, 3) kept spaced from each other. Then, the split mold members (2, 3) are joined to each other and air is blown into the thus-joined split mold members. A neck hole (75) is concurrently formed during the blow molding.

32 Claims, 23 Drawing Sheets

ELASTOMERIC DOLL HEAD, MOLDING METHOD AND MOLD THEREFOR

TECHNICAL FIELD

This invention relates to an elastic doll head formed by blow molding, a method for molding the same and a mold therefore.

BACKGROUND ART

Conventionally, a head for a doll or a doll head which exhibits elasticity has been generally formed of molten vinyl chloride by slush molding or rotational molding. Both slush molding and rotational molding prevent formation of such a parting line as seen in a molded doll head made by blow molding, to thereby provide a molded article or doll satisfactorily finished. Also, rotational molding leads to mass production of the doll heads at a reduced manufacturing cost.

Vinyl chloride contains chlorine and the above-described molding techniques require to add phthalate ester acting as a plasticizer to vinyl chloride in order to provide a molded article with elasticity or resiliency. Recently, safety of vinyl chloride and phthalate ester has been considered to be problematical, thus, use of vinyl chloride tends to be avoided in various fields. This is likewise true of a doll head, thus, it is required that the head be formed of a safe molding material.

However, application of a molding material other than vinyl chloride to slush molding or rotational molding is substantially impossible because the material fails to be gelled. Blow molding permits the material to be molded, however, it fails to prevent formation of a parting line on a surface of a face of a doll head molded. Also, it fails to permit the molding material to be satisfactorily distributed to fine uneven parts of the doll head such as eyes, a nose, a mouth and the like, resulting in the doll head being nonuniform in thickness as a whole, as shown in FIG. 30. More particularly, the above-described uneven parts are reduced in thickness as compared with the remaining part of the doll head, to thereby tend to be transparent or readily collapsed to a degree sufficient to cause damage thereto. In manufacturing of a doll head, it is highly required to satisfactorily finish a surface of a face of the doll head, to thereby ensure increased smoothness of the surface and enhanced elaborateness of unevenness of various parts of the face, as well as uniformity in thickness of the whole doll head. Unfortunately, the conventional blow molding techniques fully fail to meet such requirements.

Also, the blow molding causes an air blowing hole to be left in the molded doll head, because it requires blowing of air into a mold during molding of the doll head. Such air blowing is typically carried out through a top of the head. Thus, in this instance, formation of a hole through the top of the head is unavoidable. Unfortunately, this causes hair embedded on a portion of the head at which the hole is formed or a portion of the head near the hole to be readily detached from the portion, for example, when it is combed.

The mold used for the molding includes a pair of split mold members, of which one has an inner surface formed to have a configuration corresponding or conforming to a face of a doll head to be molded having complicated uneven or rugged portions such as eyes, a nose, ears and the like and the other has an inner surface formed to have a configuration conforming to a smooth occiput or rear head portion of the doll head reduced in unevenness. Thus, the doll head molded is desirably dropped away from the split mold members when the mold members are separated from each other after molding of the doll head. However, actually the molded article or doll head tends to be left in the mold of a configuration conforming to the face of the doll head. The molded doll head is rapidly cooled upon separation of the mold members from each other; so that when unless attention is paid to, during the molding, a degree to which force is applied to the mold for separation of the mold members and a direction in which the force is applied, the face of the molded doll head or article is apt to be damaged, leading to a deterioration in commercial value of the article.

Further, a doll head is required to exhibit elasticity sufficient to permit the doll head to provide a soft touch like the human skin. Thus, the head must meet such a requirement as well.

The present invention has been made in order to solve the above-described problems of the prior art. Thus, it is an object of the present invention to provide an elastic doll head, a method for molding the doll head and a mold for the doll head which are capable of permitting the doll head to be formed by blow molding using a molding material other than vinyl chloride while minimizing nonuniformity in thickness thereof.

It is another object of the present invention to provide an elastic doll head, a method for molding the doll head and a mold for the doll head which are capable of permitting a hair embedding treatment to be satisfactorily carried out without leaving a parting line and/or an air injection hole on a main part of an outer surface of the doll head during molding.

It is a further object of the present invention to provide an elastic doll head, a method for molding the doll head and a mold for the doll head which are capable of permitting the doll head to be effectively detached from mold members of the mold upon separation of the mold members from each other.

DISCLOSURE OF INVENTION

In accordance with one aspect of the present invention, a method for forming an elastic doll head is provided. The method is characterized in that the method comprises the steps of: providing split mold members each having an inner surface formed to have a configuration which provides a shape of the doll head when the split mold members cooperate with each other, the split mold members forming the doll head with a parting line through which the doll head is substantially equally divided into two halves; heating a molding material mainly consisting of one selected from the group consisting of a thermoplastic synthetic resin elastomer and a silicone resin material, dropping the molding material in the form of a parison into a space defined between the split mold members kept spaced from each other, joining the split mold members to each other, and blowing air into the split mold members thus joined; and separating the split mold members from each other to remove the molded doll head from the split mold members; the split mold members each being formed with a cavity and a mating surface so that the parting line is formed on the doll head so as to extend from an upper portion of a forehead of the doll head through a rear side of each of ears thereof to a rear portion of a neck thereof; one of the split mold members being formed with a neck hole forming means in a manner to be retractably advanced into the cavity; the neck hole forming means being formed with an air injection nozzle for injecting air into the cavities of the split mold members, resulting in blow molding being carried out.

In accordance with this aspect of the present invention, a method for forming an elastic doll head is provided. The method is characterized in that the method comprises the steps of: providing split mold members each having an inner surface formed to have a configuration which provides a shape of the doll head when the split mold members cooperate with each other, the split mold members forming the doll head with a parting line through which the doll head is substantially equally divided into two halves; heating a molding material mainly consisting of one selected from the group consisting of a thermoplastic synthetic resin elastomer and a silicone resin material, dropping the molding material in the form of a parison into a space between the split mold members kept spaced from each other, joining the split mold members to each other, and blowing air into the split mold members thus joined; and separating the split mold members from each other to remove the molded doll head from the split mold members; the split mold members each being formed with a cavity and a mating surface so that the parting line has a portion associated with each of ears of the doll head in a manner to extend along an outer edge of the ear.

Also, in accordance with this aspect of the present invention, a method for forming an elastic doll head is provided. The method is characterized in that the method comprises the steps of: providing split mold members each having an inner surface formed to have a configuration which provides a shape of the doll head when the split mold members cooperate with each other, the split mold members forming the doll head with a parting line through which the doll head is substantially equally divided into two halves; heating a molding material mainly consisting of one selected from the group consisting of a thermoplastic synthetic resin elastomer and a silicone resin material, dropping the molding material in the form of a parison into a space between the split mold members kept spaced from each other, joining the split mold members to each other, and blowing air into the split mold members thus joined; and separating the split mold members from each other to remove the thus-molded doll head from the split mold members; the parison being formed to have a nonuniform thickness.

In a preferred embodiment of the present invention, the air injection nozzle forms the doll head with a hole which acts as an engagement hole through which the doll head is engaged with a doll body.

In a preferred embodiment of the present invention, the pre-blowing is carried out during the blow molding. Alternatively, a stationary pin may be arranged between the split mold members, wherein the split mold members are each formed at a portion thereof corresponding to the stationary pin with a molding space for formation of an additional increased-thickness portion, and the stationary pin is embedded in the additional increased-thickness portion which the molding space is filled with during molding of the doll head.

In a preferred embodiment of the present invention, air in the cavities of the split mold members is removed through at least one of projections provided on the doll head when air is injected into the split mold members.

In a preferred embodiment of the present invention, the split mold members are each formed of a porous metal material into a breathable structure including a number of fine pores as a whole.

In a preferred embodiment of the present invention, the parison is formed to have a nonuniform thickness. In a preferred embodiment of the present invention, the parison may be formed to have a nonuniform thickness in either cross section or vertical section. Alternatively, the parison may be formed to have a nonuniform thickness in both cross section and vertical section. In a preferred embodiment of the present invention, the parison is formed by means of a die of a nonuniform diameter.

In a preferred embodiment of the present invention, the split mold members are provided at a portion thereof corresponding to a neck of-the doll head with a rod in a manner to be retractably advanced into the cavity. The rod is advanced into the cavity after injection of air and retracted from the cavity before separation of the split mold members.

In accordance with another aspect of the present invention, an elastic doll head is provided. The elastic doll head is characterized in that the doll head is made of a molding material mainly consisting of one selected from the group consisting of a thermoplastic synthetic resin elastomer and a silicone resin material by blow molding and formed thereon with a parting line which extends from an upper portion of a forehead of the doll head through a rear side of each of ears thereof to a rear portion of a neck thereof; wherein the neck has a hole formed therein during blow molding.

In a preferred embodiment of the present invention, the hole may act as an engagement hole for engaging the doll head with a doll body therethrough.

In accordance with this aspect of the present invention, an elastic doll head is provided. The elastic doll head is characterized in that the doll head is made of a molding material mainly consisting of one selected from the group consisting of a thermoplastic synthetic resin elastomer and a silicone resin material by blow molding and formed thereon with a parting line which substantially equally divides the doll head into two halves in a longitudinal direction thereof; wherein the parting line has a portion associated with each of ears of the doll head in a manner to extend along an outer edge of the ear.

In a preferred embodiment of the present invention, the doll head is formed with a neck hole. The parting line is formed so as to extend along a lower surface of a chin of the doll head from below the outer edge of each of the ears and pass around a front portion of the neck hole. For example, the doll head may be formed to have dimensions of about 40 mm in height, about 30 mm in width and about 4 mm in length between an open end of the neck hole and a step behind the open end.

In accordance with a further aspect of the present invention, a mold for forming a molding material mainly consisting of one selected from the group consisting of a thermoplastic synthetic resin elastomer and a silicone resin material into an elastic doll head by blow molding is provided. The mold is characterized in that the mold comprises: a pair of split mold members each having an inner surface formed with a cavity and a mating surface so as to form a parting line when the split mold members cooperate with each other, the parting line being formed so as to extend from an upper portion of a forehead of the doll head through a rear side of each of ears thereof to a rear portion of a neck thereof; one of the split mold members being formed at a portion thereof corresponding to a neck of the doll head with a through-hole, the through-hole having a neck hole forming means slidably fitted therein, the neck hole forming means being provided at a distal end thereof with an air injection nozzle.

In a preferred embodiment of the present invention, the split mold members are each mounted therein with a pre-pinch member for pre-blowing. The pre-pinch member is urged in a direction in which it projects from the mating surface by means of a spring. Also, a molding space is defined between the pre-pinch member of each of the split mold members and the cavity thereof for forming an additional increased-thickness portion connected to the parting line through a reduced-thickness portion.

In a preferred embodiment of the present invention, a stationary pin is arranged between the split mold members and the split mold members are each formed at a portion corresponding to the stationary pin with a molding space for forming an additional increased-thickness portion.

Best Modes for Carrying Out Invention

Figure 1:
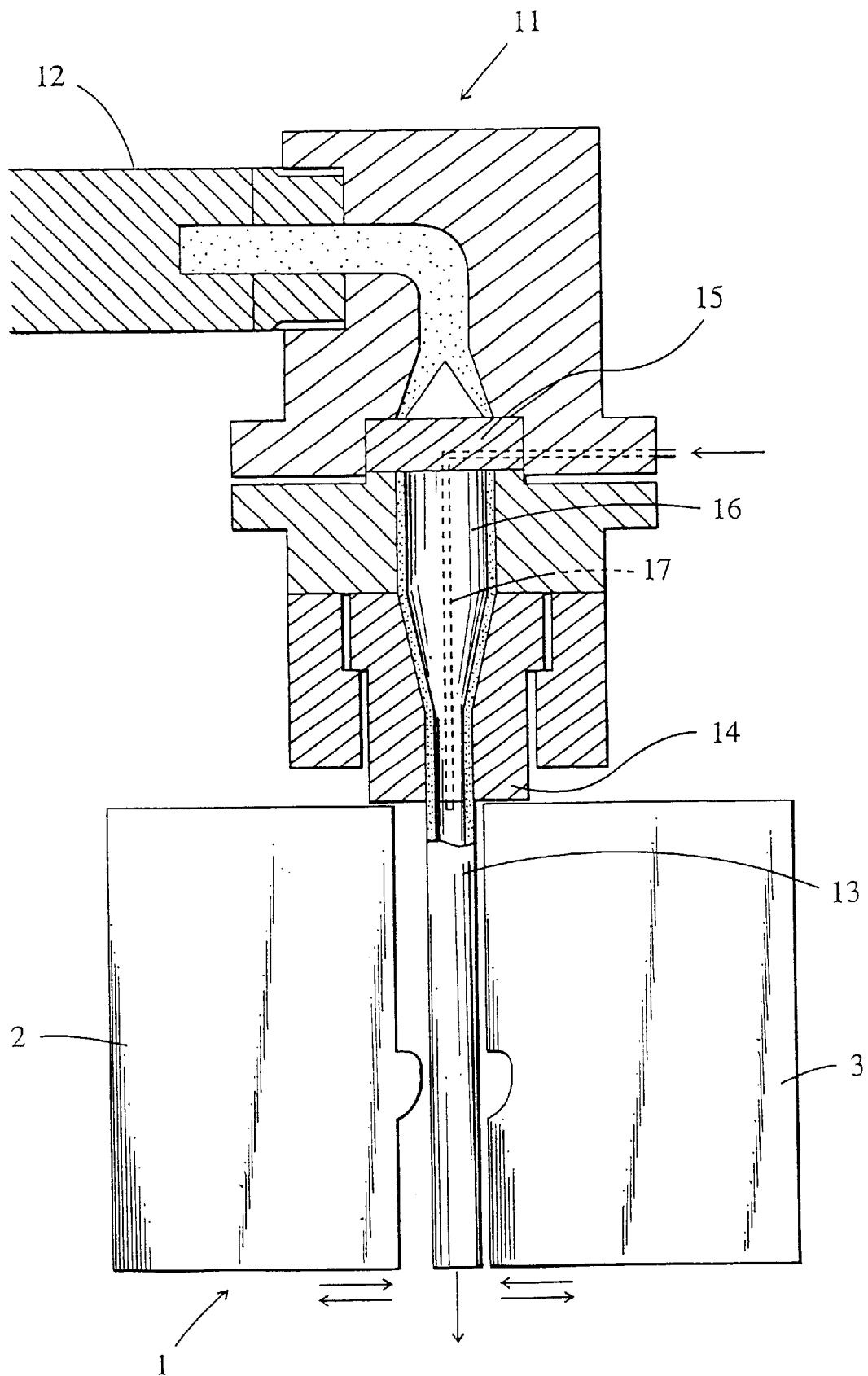
FIG. 1 is a schematic view showing a molding apparatus suitable for use for molding an elastic doll head according to the present invention.

Now, the present invention will be described with reference to embodiments thereof shown in the accompanying drawings, wherein like reference numerals designate like or corresponding parts throughout.

Figure 2:
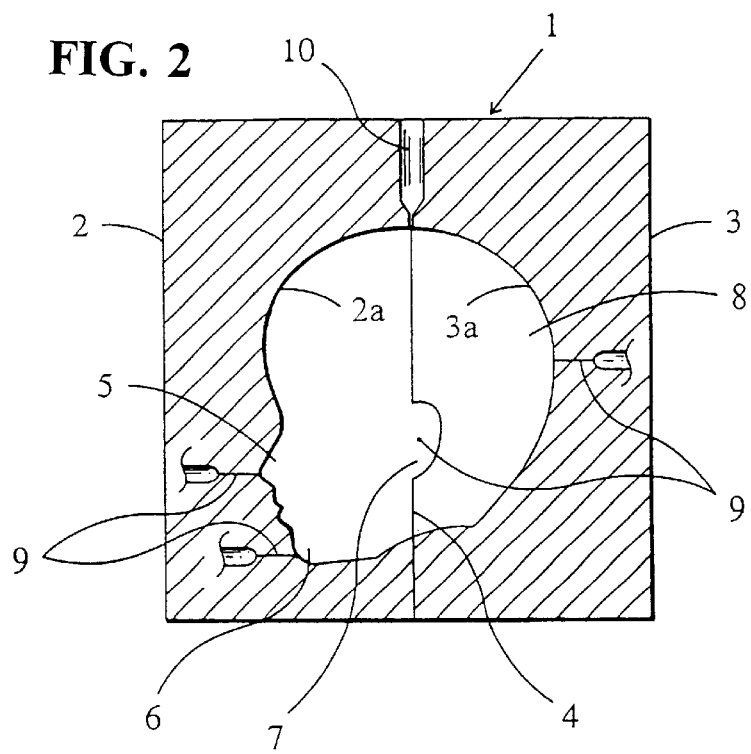
FIG. 2 is a sectional view showing a mold for a doll head which is adapted to be incorporated in the molding apparatus shown in FIG. 1.

Referring first to FIGS. 1 to 12, an embodiment of the present invention is illustrated. In FIG. 1, reference numeral 1 designates a mold. The mold 1 is applied to blow molding and constituted of two split mold members 2 and 3. As shown in FIG. 2, one of the split mold members 2 has an inner surface 2a formed to have a configuration corresponding or conforming to a face of a doll head and the other split mold member 3 has an inner surface 3a formed to have a configuration conforming to a rear portion of the doll head other than the face (hereinafter referred to as "head portion"). Thus, the split mold members 2 and 3 have cavities defined therein by the inner surfaces 2a and 3a. The thus-formed cavities of the split mold members 2 and 3 cooperate with each other to provide a cavity of the mold acting as a molding space in the mold 1 when the split mold members 2 and 3 are joined to each other. Also, the split mold members 2 and 3 have mating surfaces 4 formed so as to aligned with each other, respectively. The mating surfaces 4 cooperate with each other to define a parting line on the doll head during molding of the doll head while preventing the parting line 4 from appearing on the face of the doll head. More particularly, the mating surfaces 4 are each formed so as to extend from a substantially center of an upper portion of the doll head through an outer edge of each of ears 7 thereof to a substantially center of a neck hole thereof, to thereby substantially equally divide the head into two halves in a longitudinal direction thereof.

The split mold members 2 and 3 are provided with projections constructed so as to constitute a nose 5 of the doll head, a chin 6 thereof, the ears 7 and the head portion 8, respectively. The projections are each formed with an air vent hole 9. The air vent holes 9 are each preferably formed to have a diameter of between 0.1 mm and 0.3 mm. The air vent holes 9 for the nose 5, chin 6 and head portion 8 are each formed so as to be perpendicular to the mating surfaces 4 of the split mold members 2 and 3. Reference numeral 10 designates an air blowing hole which is formed at a portion of the mating surfaces 4 positioned at an uppermost portion of the head portion 8.

In the illustrated embodiment, the air vent holes 9 for air removal are provided at the projections of the split mold members 2 and 3. However, it is merely required that the air vent hole 9 be provided at least one location. In general, the air vent holes 9 are preferably provided at each of the nose and a mouth of the doll head, although the embodiment is not limited to such arrangement. The term "projections" used herein indicate not only portions corresponding to elements of the doll head outwardly projecting from a surface of the head such as the nose 5 and chin 6 but non-recessed portions or outwardly convex portions corresponding to elements of the doll head such as lips, cheeks, a forehead and the like. Thus, the projections further include portions positioned away from the mating surfaces 4 of the split mold members 2 and 3, to thereby cause air to remain therein, such as the head portion 8 and chin 6 at which the air vent holes 9 are arranged. The ears 7 are arranged in proximity to the mating surface 4 between the split mold members 2 and 3, to thereby minimize remaining of air therein. Thus, it is not necessarily required to form each of the ears 7 with the air vent hole 9.

The mold 1 is fed with a molding material by means of a blow molding apparatus 11 shown in FIG. 1. The blow molding apparatus 11 is constructed so as to form a molten molding material into a tubular or cylindrical parison 13 by means of an extruder 12 and then extrude it into the mold 1. The blow molding apparatus 11 includes an outer die 14, an inner nozzle 16 held on a spider 15 and an air blowing pipe 17 formed so as to extend through a center of the nozzle 16. This permits the parison 13 to be extruded from a space between the die 14 and the nozzle 16 and air to be blown out of the air blowing pipe 17 centrally arranged. A thickness of the parison 13 is determined depending on the die 14 and nozzle 16. When a doll head of about 40 mm in height and about 30 mm in width is to be molded, the parison 13 may be set to be about 14 mm in outer diameter, about 6 mm in inner diameter and about 4 mm in thickness.

Now, manufacturing of the doll head will be described.

First of all, a molding material is provided, which mainly consists of a thermoplastic synthetic resin elastomer because the doll head which is a molded article is required to exhibit soft elasticity like the human skin. The molding material may also contain additives such as a plasticizer, a coloring agent and the like, which are added to the elastomer. The thermoplastic elastomers include an olefin elastomer, a styrene elastomer, a styrene-butadiene elastomer, an urethane elastomer, a polyester elastomer, a polyethylene elastomer and the like. Such a thermoplastic elastomer is kept from such gelation as encountered in vinyl chloride when a plasticizer is added thereto and effectively applied as a molding material for blow molding. Also, it permits a variety of plasticizers to be used for the molding material. Thus, the present invention excludes incorporation of any chlorine elastomer into the molding material. Also, the present invention keeps phthalate ester from being used as a plasticizer for the molding material. Alternatively, silicone resin may be used for the molding material in place of the above-described elastomer.

In the illustrated-embodiment, an olefin elastomer material which is commercially available under the trademark "Toughmer" from Mitsui Chemicals, Inc. may be used for the molding material.

Figure 3:
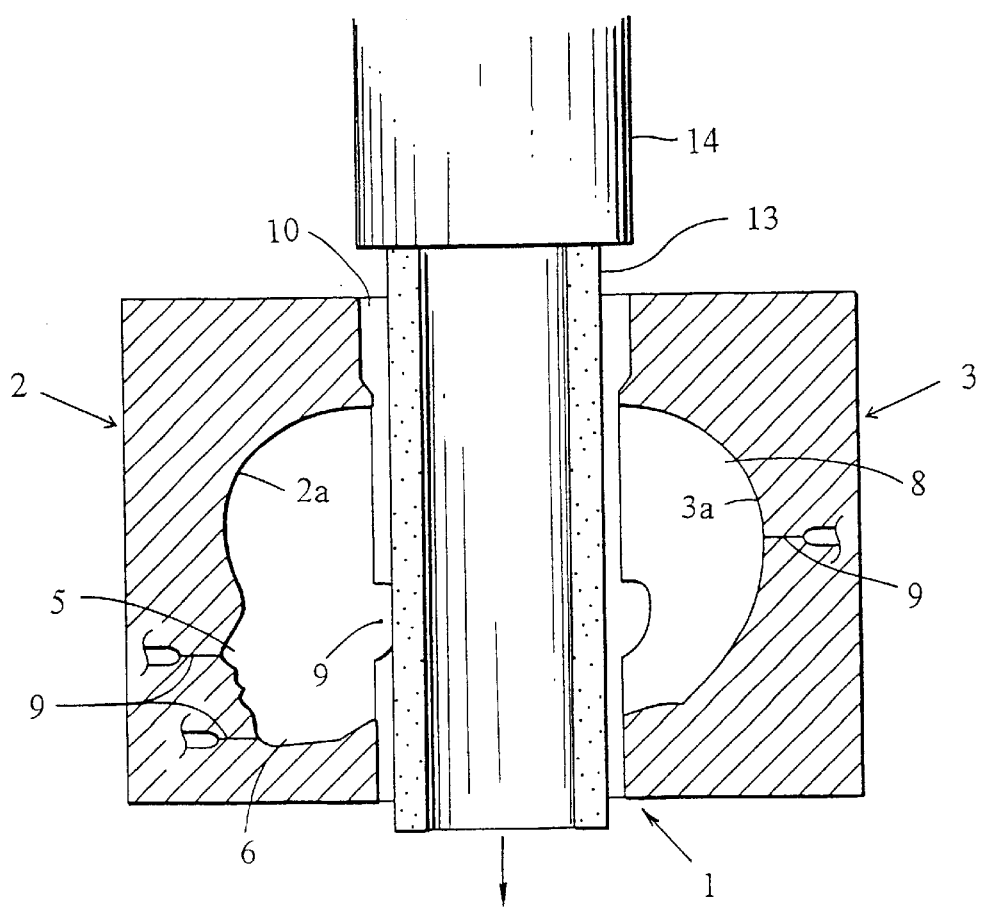
FIG. 3 is a sectional view of the mold in which a parison is advanced.
Figure 4:
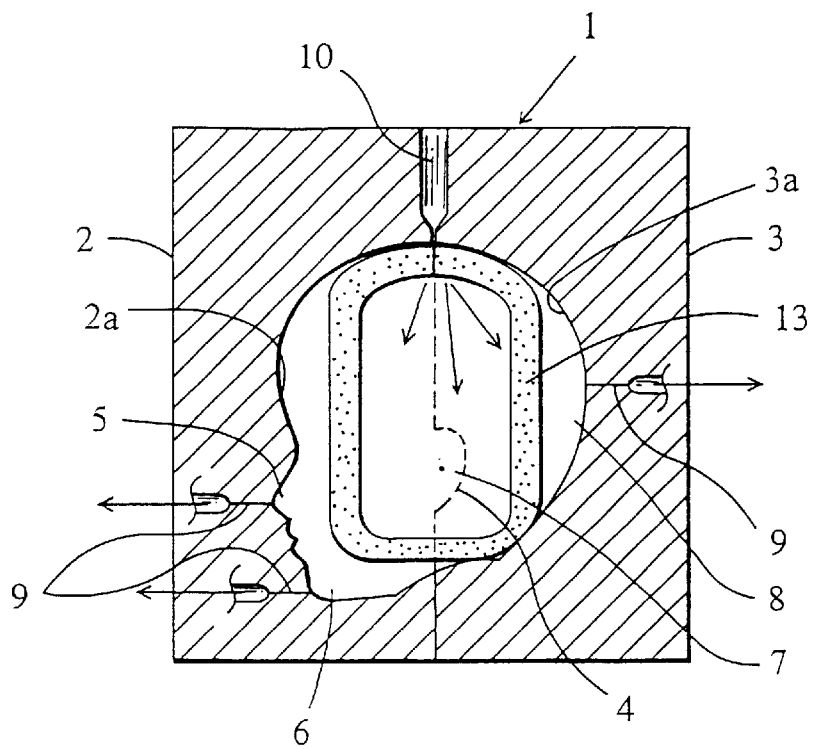
FIG. 4 is a sectional view of the mold into which air is injected.

Then, the above-described molding material is heated and then dropped in the form of the cylindrical parison 13 into a space between the two split mold members 2 and 3 separated from each other as shown in FIG. 3. Subsequently, the split mold members 2 and 3 are joined together as shown in FIG. 4 and then air is blown into the mold through the air blowing pipe 17 and air blowing hole 10. The parting line defined by the split mold members 2 and 3 is formed on the doll head so as to substantially equally divide the head of a substantially spherical shape into two halves in the longitudinal direction thereof. This permits the parison 13 to be balanced in both anteroposterior and lateral directions.

A position at which blowing of air is carried out is not limited to a top of the head. It may be carried out at a neck of the doll head.

Figure 5:
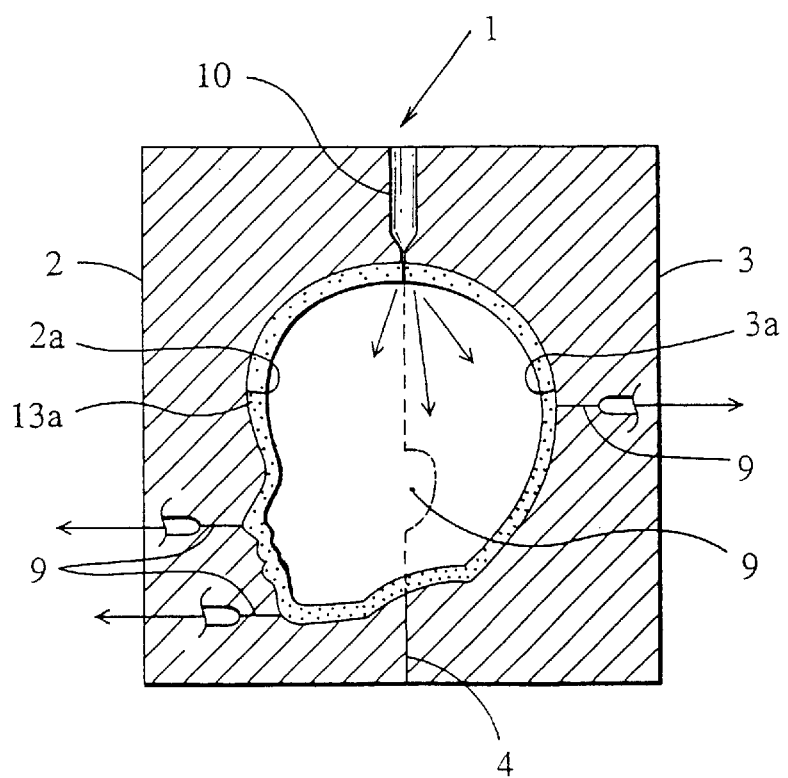
FIG. 5 is a sectional view of the mold which has a molding material intimately contacted with an inner surface thereof.

The molding material is heated to a temperature of between 140° C. and 180° C. (optimum temperature: 160° C.) and the above-described air blowing is carried out under a pressure of between 4 kgf/cm$^2$ and 5 kgf/cm$^2$. The air blowing permits expansion of the parison 13, so that the parison 13 may be stuck on the inner surface of the mold 1. In order to remove a part of air originally present or remaining in the cavities of the split mold members 2 and 3, the residual air is removed substantially concurrently with air blowing. This prevents the residual air from forming a wall of a kind, to thereby ensure that the molding material 13a is closely contacted with the whole inner surface of the mold 1, as shown in FIG. 5.

Figure 6B:
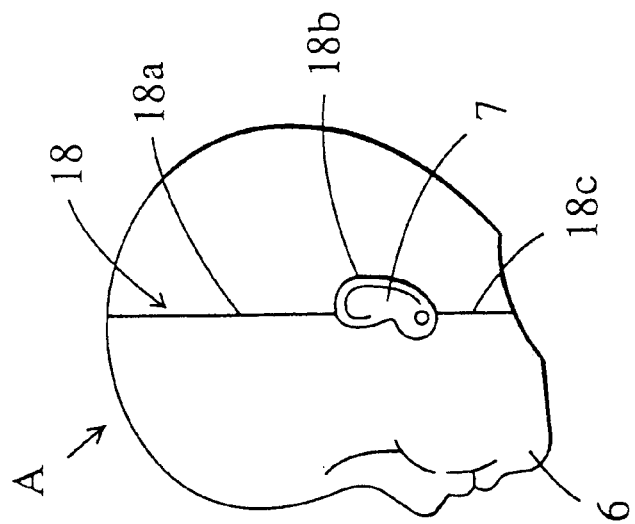
FIGS. 6A and 6B are a front elevation view and a side elevation view each showing a molded doll head, respectively.
Figure 6A:
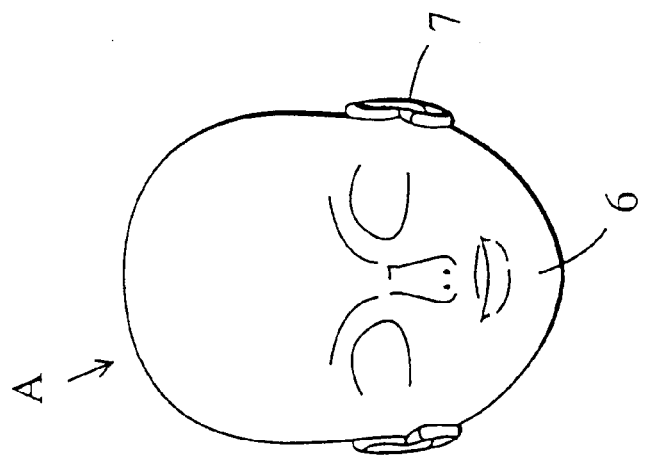
Figure 7:
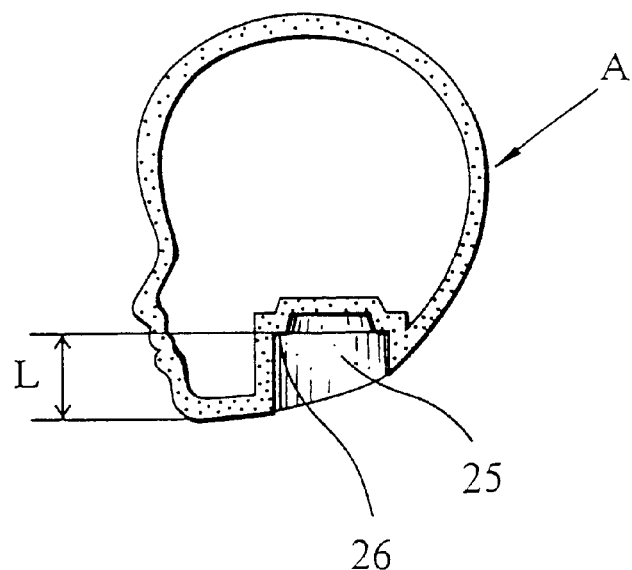
FIG. 7 is a vertical sectional view showing a molded doll head.

After the air blowing, the mold members 2 and 3 of the mold 1 are separated from each other to remove the doll head from the mold, so that molding of the doll head is completed as shown in FIGS. 6A and 6B, resulting in a molded doll head product A being obtained. The illustrated embodiment prevents the ears 7 of the molded product or doll head from catching in the mold 1 during removal of the doll head, so that the molded product may be smoothly removed from the mold 1 without being damaged. Also, the illustrated embodiment substantially restrains air from being confined in the ears 7 near the parting line when the mold members are joined together, to thereby substantially eliminate a necessity of forming each of the ears with the air vent hole 9, leading to a reduction in molding time correspondingly.

In the illustrated embodiment, the molded product or doll head A is formed to have dimensions of about 40 mm in height and about 30 mm in width. Also, it is so formed that a length L between an open end of a neck hole 25 and a step 26 positioned behind the neck hole 25 is about 4 mm. In the prior art, the length L is set to be about 6 mm. This is due to the fact that the conventional doll head is molded by slush molding. In blow molding by which the doll head of the illustrated embodiment is formed, formation of the neck hole 25 is carried out after the air injection, so that setting of the length L at about 6 mm as in the prior art causes a reduction in thickness of a portion of the doll head around the neck hole 25. Such a disadvantage is effectively eliminated by setting the length L at about 4 mm.

Figure 8:
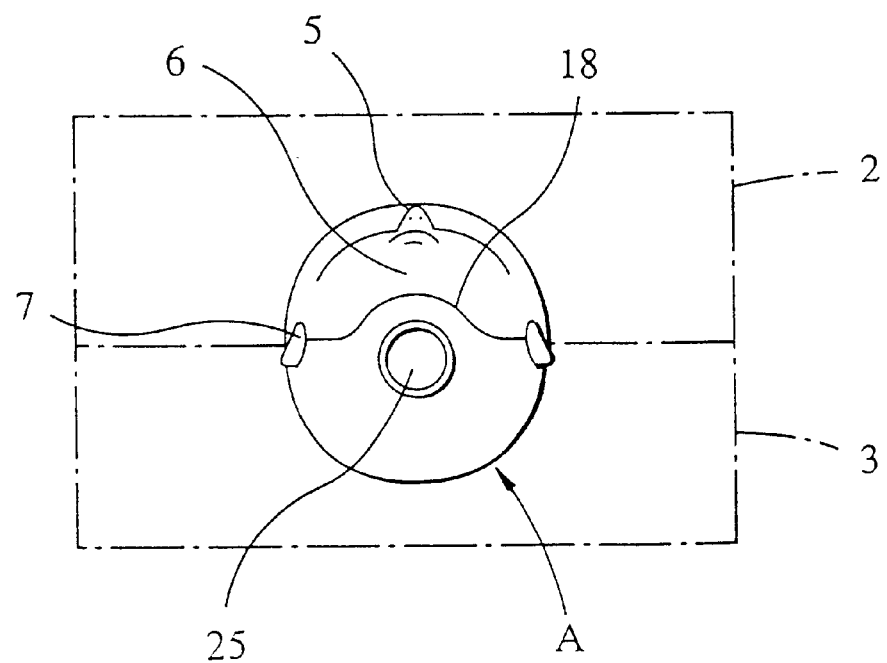
FIG. 8 is a bottom view showing another example of a parting line formed on a doll head.

As shown in FIG. 8, a parting line 18 defined by the split mold members 2 and 3 is preferably formed so as to extend from below an outer edge of each of the ears 7 to a lower surface of the chin 6 while passing around a front part of a neck in which the neck hole 25 is defined. In this instance, the parison is somewhat deflected or offset toward the uneven nose 5 and chin 6, so that the molding material may be satisfactorily distributed throughout the mold 1, to thereby ensure that the molded article has a thickness increased in uniformity.

In the illustrated embodiment, the parison is formed to have a substantially uniform thickness. Alternatively, the parison may be formed to have a nonuniform thickness, to thereby render a whole thickness of the molded product or doll head equal or uniform. Now, such a modification will be described in detail.

For this purpose, the blow molding apparatus 11 shown in FIG. 1 may be likewise used. The parison 13 is formed to have a nonuniform thickness. More specifically, it is so formed or extruded that portions thereof corresponding to front and rear parts of the doll head have a thickness increased as compared with the remaining part thereof.

Figure 9A:
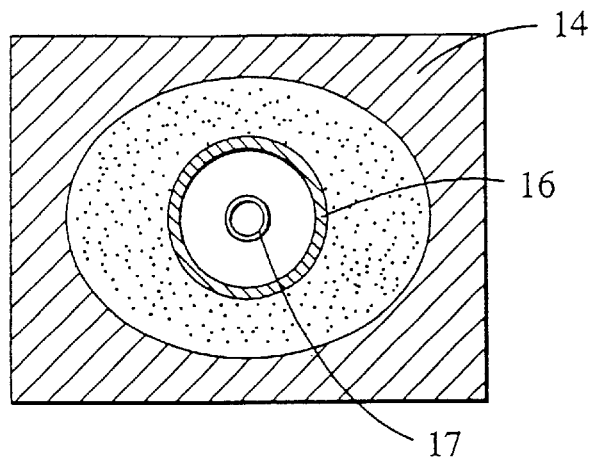
FIG. 9A is a cross sectional view showing adjustment of a thickness of a parison in cross section.

More particularly, as in the embodiment described above, the parison 13 is extruded from the space between the die 14 and the nozzle 16 and air is blown out of the air blowing pipe 17 centrally arranged. In this instance, a thickness of the parison is determined by the die 14 and nozzle 16. The parison having a nonuniform thickness or nonuniform-thickness parison 13, as shown in FIG. 9A, may be obtained by forming the die 14 into a nonuniform diameter and more particularly forming an inner surface of the die 14 into a substantially elliptic configuration. Alternatively, it may be obtained by forming the nozzle 16 into an outer surface of a substantially elliptic shape.

Thus, in the modification, the parison 13 which is formed to have a nonuniform thickness in cross section is fed to the blow molding apparatus 1. When a doll head having dimensions of about 40 mm in height and about 30 mm in width is to be molded, the parison 13 may be generally formed to have dimensions of about 26 to 32 mm in lateral length, about 28 to 34 mm in anteroposterior length, about 10 to 12 mm in lateral thickness and about 11 to 13 mm in anteroposterior thickness.

In the modification, such a molding material as described above may be likewise used. A thermoplastic elastomer commercially available under the trademark "Septone" from KURARAY CO., LTD. may be used for the molding material.

Then, the above-described molding material is heated and then dropped in the form of the cylindrical parison 13 into the space between the two split mold members 2 and 3 separated from each other as in the embodiment shown in FIGS. 3 and 4. Subsequently, the split mold members 2 and 3 are joined to each other and then air is blown into the mold through the air blowing pipe 17. The parting line defined by the split mold members 2 and 3 is formed on the doll head so as to substantially equally divide the doll head of a substantially spherical shape into two halves in the longitudinal direction thereof. This permits the parison 13 to be balanced in both anteroposterior and lateral directions.

The molding material is heated to a temperature of between 170° C. and 190° C.(optimum temperature: 180° C.) and the above-described air blowing is carried out under a pressure of between 4 kgf/cm² and 5 kgf/cm². The air blowing permits expansion of the parison 13, so that the parison 13 may be stuck on the inner surface of the mold 1. The molding material is heated at a temperature set between 170° C. and 190° C., so that the parison 13 may be uniformly expanded. In this instance, air initially present in the cavities of the split mold members partially remains between the parison 13 and an inner surface of the mold 1. Thus, the residual air is removed substantially concurrently with the air blowing. This prevents the residual air from forming a wall of a kind, to thereby ensure that the molding material is closely contacted with the whole inner surface of the mold 1.

Also, in the modification, the parison dropped into the split mold members 2 and 3 may be formed to have a nonuniform thickness, so that a portion of the parison 13 increased in thickness may be fed to a portion of the mold apart from the parting line in-the anteroposterior direction thereof. This permits a molding material 13a in a sufficient amount to be satisfactorily distributed to the portions of the mold corresponding to projections of the doll head such as a nose of the doll head, a chin thereof, a mouth thereof, a rear head thereof and the like, to thereby prevent only such projections from being reduced in thickness.

Then, the doll head is removed from the mold after separation of the mold members 2 and 3 from each other, so that molding of the doll head is completed as in FIGS. 6A and 6B, resulting in a molded doll head product A which has a substantially uniform thickness being obtained. Thus, the modification likewise exhibits advantages of permitting the molded product to be smoothly removed from the mold without being damaged and eliminating a necessity of forming any air vent hole at each of the ears.

Figure 9B:
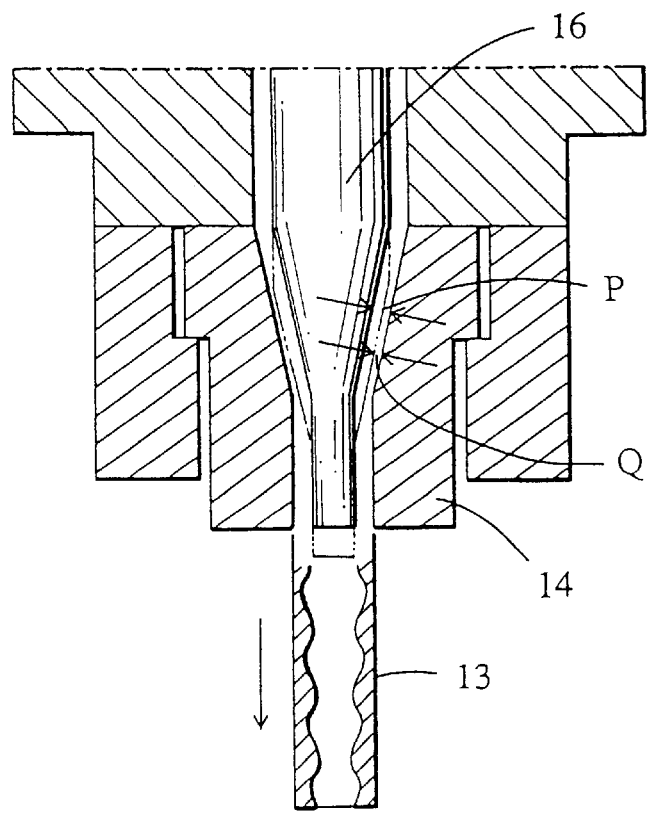
FIG. 9B is a vertical sectional view showing adjustment of a thickness of a parison in a vertical direction.
Figure 10:
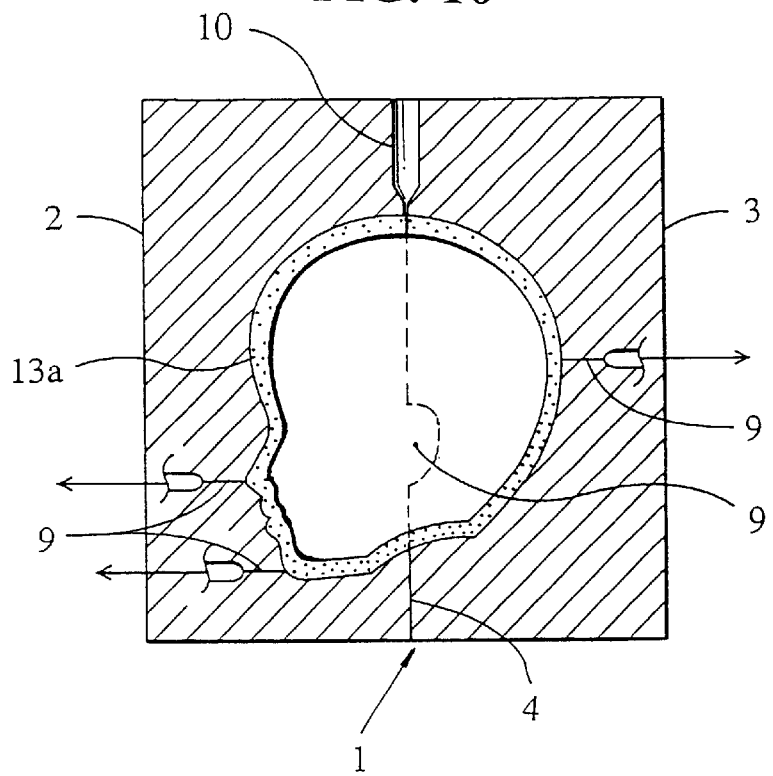
FIG. 10 is a sectional view showing distribution of a molding material throughout a mold.
Figure 11A:
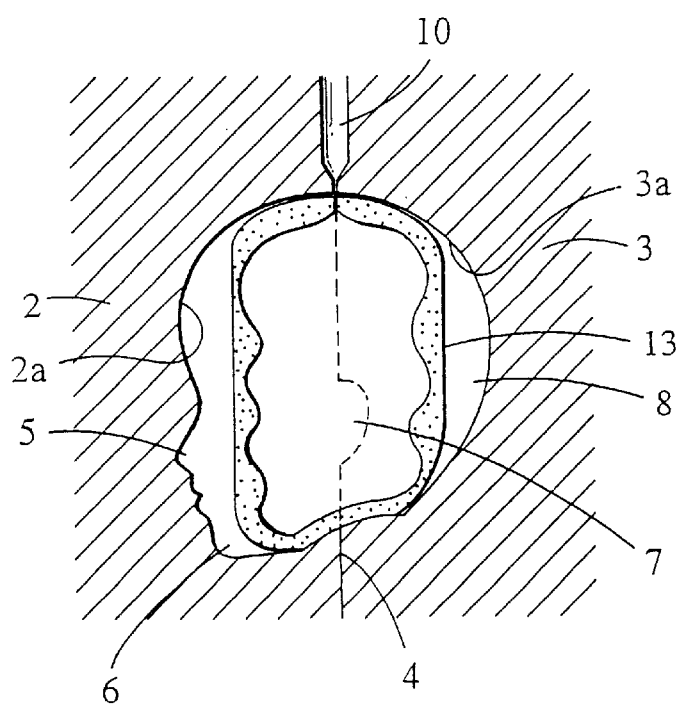
FIG. 11A is a vertical sectional view showing adjustment of a thickness of a parison in vertical section.
Figure 11B:
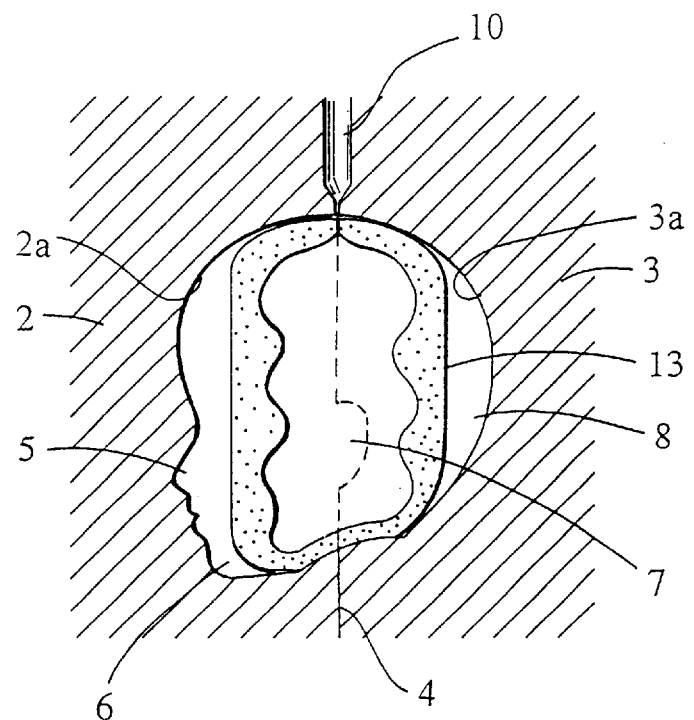
Fig. 11B is a vertical sectional view showing adjustment of a thickness of a parison in both cross section and vertical section.

Alternatively, formation of the nonuniform-thickness parison 13 into the doll head of a substantially uniform thickness may be carried out by feeding the parison 13 of which a thickness in vertical section is rendered nonuniform by parison control as shown in FIG. 9B. Such adjustment of a thickness of the parison may be also carried out by finely moving the nozzle 16 in a vertical direction to vary a width P or Q of a path of the molding material, as shown in FIG. 9B. The control described above, as shown in FIG. 1A, permits the portions of the parison corresponding to, for example, the nose 5 and chin 6 to be increased in thickness as compared with portions thereof corresponding to the forehead and mouth.

Also, a combination between use of the nonuniform die and the parison control for the purpose of feeding the parison of which a thickness in both cross section and longitudinal section is rendered nonuniform, as shown in FIG. 1B, permits the thickness to be finely adjusted not only in anteroposterior and lateral directions of the parison but in a vertical direction thereof, leading to an increase in thickness of the parison, for example, in the anteroposterior direction, as well as an increase in thickness of a portion of the parison corresponding to the nose 5, ears 7 and chin 6. This results in a whole thickness of the doll head being uniform.

Formation of the doll head in the manner described above prevents the parting line from appearing on the face of the doll head which is the most important part of the doll head, because the one split mold member 2 has the inner surface 2a formed to have a configuration conforming to the face of the doll head and the other mold member 3 has the inner surface 3a formed to have a configuration corresponding to the head portion of the doll head.

The parting line 18 is formed on the doll head so as to extend from the top of the doll head through the ears 7 and chip 6 to the bottom of the neck. In this instance, a portion 18a of the parting line 18 between the top of the doll head and a side head portion thereof above the ears 7 shown in FIG. 6B is covered with hair or a wig, to thereby be invisible or out of sight. A portion 18b of the parting line 18 associated with the ears 7 is formed so as to extend along an outer edge thereof, resulting in it being substantially out of sight. Also, a portion 18c of the parting line 18 positioned rear the chin 6, when the doll head includes long hair, is covered with the hair, resulting in it being out of sight. Further, the position of the portion 18c renders the portion 18c essentially hard to be observable, so that it does not deteriorate an appearance of the doll head even when the doll head includes a short hair. Thus, it will be noted that the parting line 18 is kept from deteriorating an appearance of the doll head.

In the illustrated embodiment, the residual air is outwardly removed from the air vent holes 9 formed at the portions of the mold 1 corresponding to the nose 5, chin 6, ears 7 and head portion 8 substantially simultaneously with the air blowing during the molding, to thereby ensure that the molding material is evenly fed or distributed to the portions of the mold. This permits the nose 5 of the doll head to have a tip and nares formed to have a sharp configuration exactly conforming to the mold. It was found that when molding of a doll head having dimensions of about 40 mm in height and about 30 mm in width is desired, the air bent holes 9 are each most preferably formed to have a diameter of about 0.2 mm. When the molded product or doll head is formed so as to have a useless portion of 0.3 mm or more in size, an after-treatment is facilitated. Thus, when a doll head of a large size is to be manufactured, the air vent hole 9 may be formed to have a diameter of 0.3 mm or more and the useless portion may be trimmed.

Figure 12:
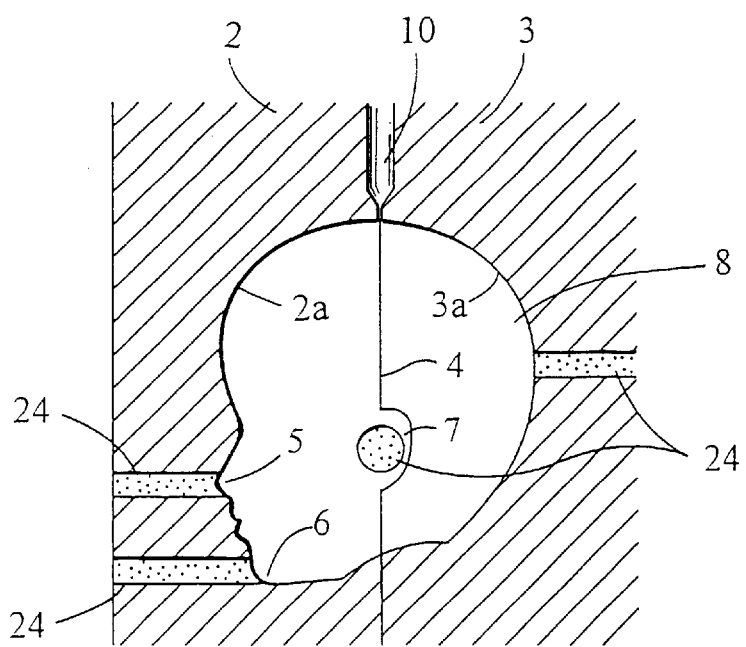
FIG. 12 is a sectional view showing another embodiment of a mold according to the present invention which is adapted to be used for molding a doll head.

In the illustrated embodiment, removal of air from the cavities is carried out through the air vent holes 9 of a fine size formed through the split mold members 2 and 3. Alternatively, it may be carried out as shown in FIG. 12. More particularly, the split mold members 2 and 3 each have a porous member 24 inserted therethrough. The porous members 24 are each formed at an end surface thereof facing the cavity into a configuration corresponding to the nose 5, ears 7 or the like. The porous member 24 preferably has pores formed to have a diameter of about 0.03 to 0.1 mm.

Alternatively, the whole mold may be made of a porous metal material which is constructed into a breathable structure having a number of fine pores formed therein. The porous metal material may be commercially available, for example, under the trademark "Porcerax" from SINTOKOGIO, LTD. Such configuration eliminates a necessity of forming the air vent holes.

More specifically, the above-described configuration permits the residual air forced out of the cavities due to expansion of the parison by the air blowing during the molding to be naturally outwardly discharged through the pores of the mold, to thereby prevent the residual air from forming a wall of a kind, resulting in ensuring that the molded product has a configuration exactly conforming to the mold and exhibits sufficient elasticity. When the porous member is used as described above, the air may be forcibly removed through the pores of the member.

A number of thermoplastic elastomers may be applied to the illustrated embodiment. It is a matter of course that the molding temperature and a thickness of the parison are varied depending on the elastomers.

In the illustrated embodiment, the parting line is formed so as to extend from the top of the doll head through the side head portion and the back of the chin to the lower portion of the neck. In this instance, the portion of the parting line extending from the top of the head to the side head portion above the ears is covered with hair or a wig, to thereby be prevented from being externally exposed, resulting in it being out of sight. Also, the portion of the parting line associated with the ears is formed so as to extend along the outer edge thereof, resulting in being substantially out of sight. Further, the portion of the parting line positioned rear the chin, when the doll head includes long hair, is covered with the hair, resulting in being out of sight. A position of such a portion essentially renders the portion hard to be observable, resulting in the portion being prevented from deteriorating an appearance of the doll head even when the doll head includes short hair. Thus, it will be noted that the parting line is kept from deteriorating an appearance of the doll head.

Also, the illustrated embodiment does not cause a problem such as environmental hormones or the like, resulting in the molded doll head being harmless to the human body, because the molding material is free from vinyl chloride. Also, the doll head exhibits a soft feeling like the human skin. Thus, the doll head of the illustrated embodiment provides a doll suitable for pseudo-experience in play by infants and children.

In addition, the molding material consists of a thermoplastic elastomer or a silicone resin material, so that the molded doll head may exhibit a soft feeling and elasticity like the human skin.

Further, the parting line defined by the split mold members is formed so as to substantially equally divide the head of a substantially spherical shape into two halves in the longitudinal direction, so that the parison may be balanced in both anteroposterior and lateral directions. This permits the molding material to be satisfactorily distributed throughout the mold during the molding, so that the doll head may have a substantially uniform thickness.

In the illustrated embodiment, the split mold members are so constructed that the parting line is formed so as to extend from a lower portion of the outer edge of each of the ears through a lower surface of the chin to the neck hole and pass around a front portion of the neck hole. Such construction permits the parison to be deflected toward the portions of the mold corresponding to the uneven nose and chin during blow molding, resulting in the molding material being satisfactorily distributed throughout the mold, so that the whole molded doll head may be further increased in uniformity of thickness.

Also, in the doll head of the illustrated embodiment, a length thereof between the open end of the neck hole and the step behind the open end is formed to be about 4 mm while keeping the whole dimensions of the doll head at about 40 mm in length and about 30 mm in width which are substantially the same as in a head of a conventional dress-up doll. This prevents a neck hole portion from being reduced in thickness.

Further, the molded product or doll head exhibits elasticity sufficient to permit the product to be smoothly removed from the mold, to thereby effectively prevent damage to undercut portions such as the nose, the chin and the like.

In the illustrated embodiment, the parison may be formed to have an nonuniform thickness, so that a whole thickness of the parison may be adjusted to be uniform during the molding, resulting in the molding material being effectively distributed or fed in a sufficient amount to the portion of the mold apart from the parting line, to thereby eliminate a reduction in thickness of the molded doll head conventionally caused by blow molding. This permits a thickness of the molded doll head to be relatively uniform and eliminates disadvantages of rendering the doll head transparent and causing only a part of the doll head to be collapsed due to touch by a finger or the like, to thereby prevent a deterioration in commercial value of the doll head. Also, production of the nonuniform-diameter parison may be carried out by the nonuniform-diameter die, resulting in being facilitated while reducing a manufacturing cost.

Also, in the illustrated embodiment, air in the cavities of the split mold members may be removed therefrom through at least one of the projections for the nose and the like during blowing of air into the mold, to thereby provide the doll head with a sharp configuration exactly conforming to the mold. This provides the doll head with good appearance and increased aesthetic properties in cooperation with use of the nonuniform-diameter parison.

In the illustrated embodiment, the split mold members may be made into a porous structure having a number of pores formed therein. Such construction prevents air from remaining in the mold without any specific air vent means, to thereby ensure satisfactory molding of the doll head.

In the illustrated embodiment, the parison may be formed to have a nonuniform thickness in cross section, so that the molded product may be increased in thickness thereof in an anteroposterior direction of the product as compared with a lateral direction thereof. This eliminates a disadvantage such as a reduction in thickness caused by blow molding conventionally carried out in the prior art and permits the molding material to be fully distributed or fed to a portion of the mold apart from the parting line, to thereby form the whole doll head into a uniform thickness.

In the illustrated embodiment, the parison may be formed to have a nonuniform thickness in vertical section. Such configuration ensures that the nose and chin of the doll head of which a thickness is reduced by blow molding conventionally carried out in the prior art are increased in thickness as compared with the forehead and mouth, so that the molded doll head may have a uniform thickness as a whole.

Further, the illustrated embodiment may be constructed so that a thickness thereof in each of cross section and vertical section is nonuniform. Such configuration permits a thickness of the doll head to be finely adjusted in the anteroposterior and lateral directions, as well as the vertical direction, so that the doll head may be formed to have a more uniform thickness.

Referring now to FIGS. 13 to 19, another embodiment of the present invention is illustrated.

Figure 13:
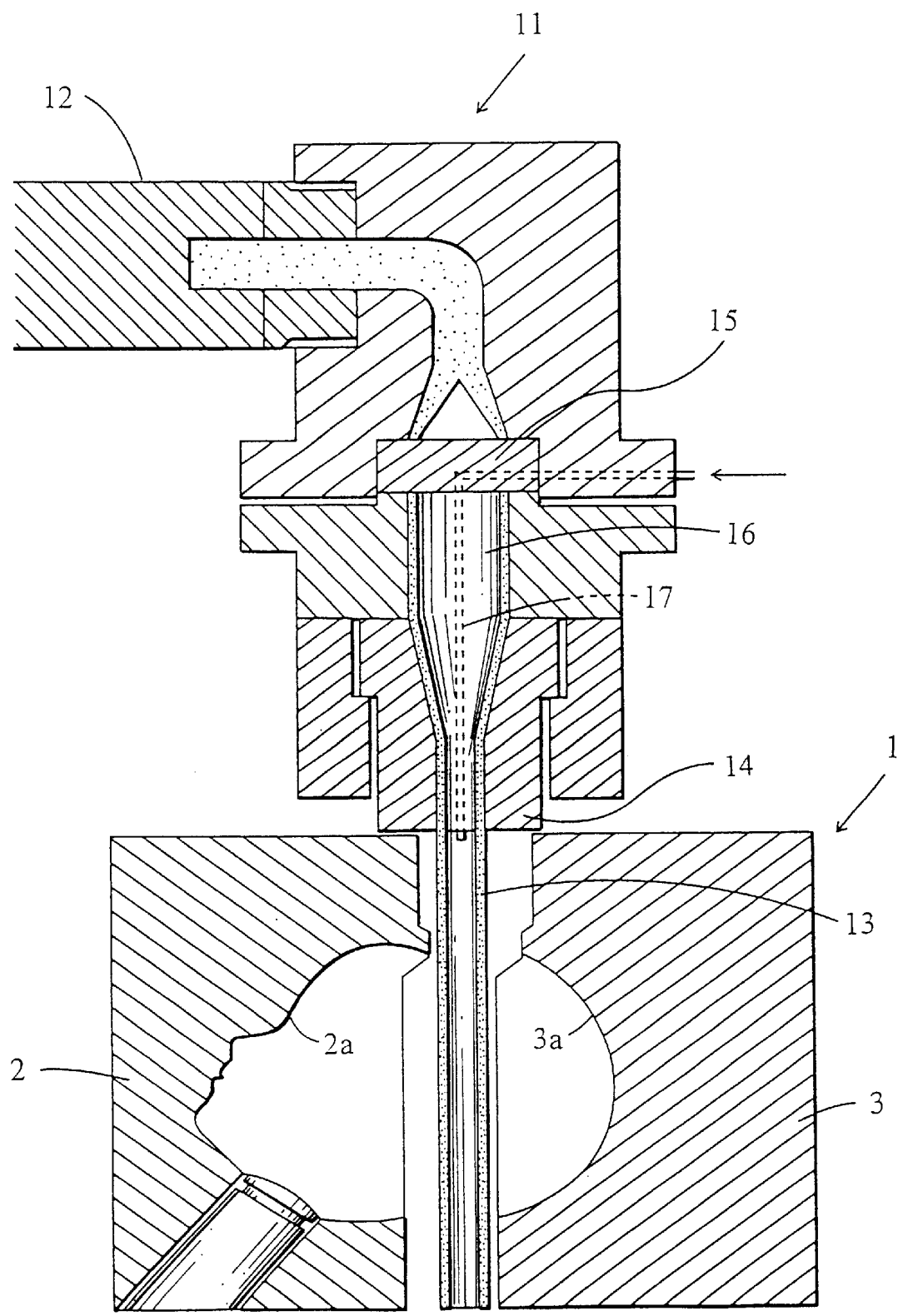
FIG. 13 is a schematic view showing another example of a molding apparatus suitable for use in a method for molding an elastic doll head according to the present invention.

In FIG. 13, reference numeral 1 designates a mold and 11 is a blow molding apparatus. The mold 1 is applied to blow molding and constituted of two split mold members 2 and 3. One of the split mold members which is designated at reference numeral 2 has an inner surface 2a formed to have a configuration corresponding or conforming to a face of a doll head and the other split mold member 3 has an inner surface 3a formed to have a configuration conforming to a rear portion of the doll head other than the face or a head portion 8. The split mold members have cavities defined therein by the inner surfaces 2a and 3a, respectively, which cavities cooperate with each other to define a cavity of the mold acting as a molding space in the mold 1 when the split mold members 2 and 3 are joined to each other. Also, the split mold members 2 and 3 are formed with mating surfaces 4, respectively, which cooperate with each other to define a parting line so that the parting line does not appear on the face of the doll head when the split mold members are joined together. More particularly, the mating surfaces 4 are formed so as to be positioned at a hairline of hair of the doll head or in proximity thereto.

Figure 14:
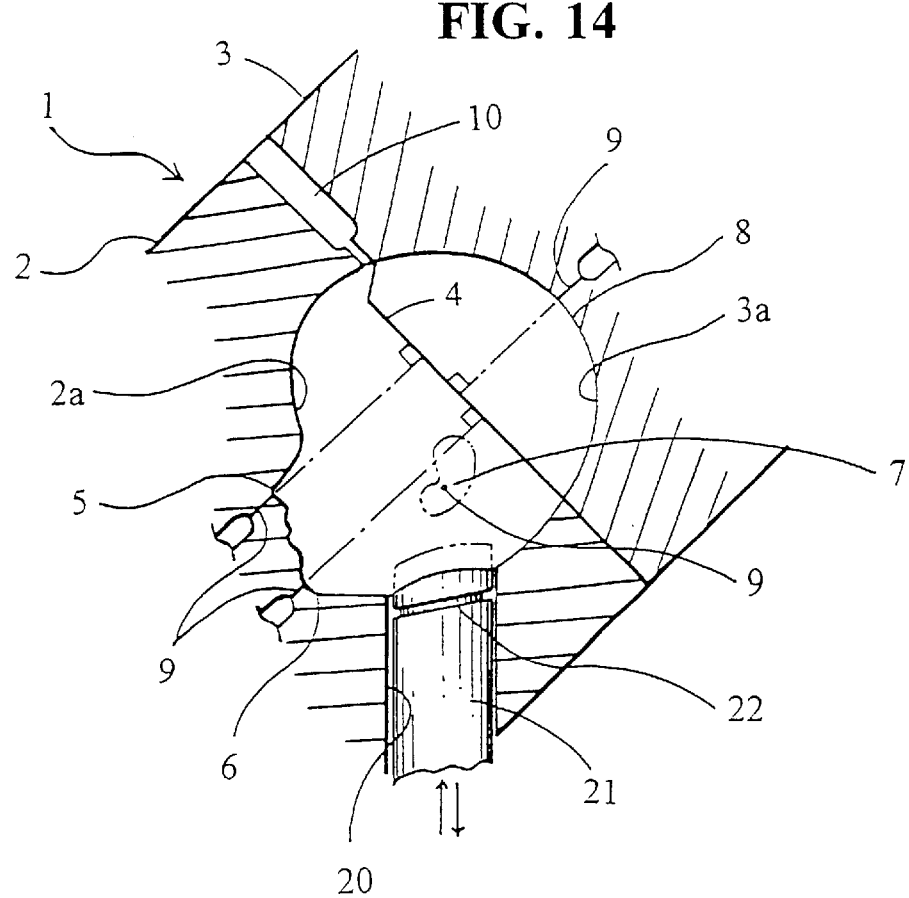
FIG. 14 is a sectional view showing a mold for a doll head which may be used in the molding apparatus of FIG. 13.

The split mold members 2 and 3, as shown in detail in FIG. 14, are provided with projections adapted to provide a nose 5 of the doll head, a chin 6 thereof, ears 7 thereof and a head portion 8 thereof during molding, respectively. The projections are each formed with an air vent hole 9. The air vent holes 9 are each preferably formed to have a diameter of between 0.1 mm and 0.3 mm. The air vent holes 9 at the projections corresponding to the nose 5, chin 6 and head portion 8 are each formed so as to be perpendicular to the mating surface 4 of the split mold member 2. Also, the air vent hole 9 for each of the ears 7 is formed so as to be perpendicular to a plane (not shown) defined at a center as viewed from a front side of the mold. Reference numeral 10 designates an air blowing hole which is formed at a portion of the mating surface 4 positioned at an uppermost portion of the head portion 8.

One of the mold members 2 is formed at a portion thereof corresponding to a neck of the doll head with a cylindrical through-hole 20. The through-hole 20 has a rod 21 slidably inserted therethrough so that it may be retractably advanced into the cavity of the mold 1. The rod 21 is formed on a peripheral surface of a distal end thereof with a ring-like groove 22. The rod 21 may be actuated by any suitable means (not shown) arranged outside the mold 1 such as an air cylinder unit, a hydraulic cylinder unit or the like.

The mold 1 is fed with a molding material by means of the blow molding apparatus 11 shown in FIG. 13. The blow molding apparatus 11 is constructed so as to form a molten molding material into a tubular parison 13 by means of an extruder 12 and then extrude it into the mold 1. The parison 13 is extruded in the form of a nonuniform-thickness parison or in the state that a thickness thereof is rendered nonuniform. In the illustrated embodiment, the parison 13 is extruded so that portions thereof corresponding to front and rear portions of the doll head are increased in thickness as compared with the remaining portion thereof. However, the parison is not limited to such a configuration.

The blow molding apparatus 11 includes an outer die 14, an inner nozzle 16 held on a spider 15 and an air blowing pipe 17 arranged so as to extend through a center of the nozzle 16. This permits the parison 13 to be extruded from a space between the die 14 and the nozzle 16 and air to be blown out of the air blowing pipe 17 centrally arranged. A thickness of the parison 13 is determined depending on the die 14 and nozzle 16. Thus, the nonuniform-thickness parison 13 suitable for molding of a doll head may be obtained by adjusting a thickness of the parison in anteroposterior and lateral directions thereof and/or that in a vertical direction thereof using the die 14 or nozzle 16 formed to have a nonuniform diameter as shown in FIG. 9A or 9B or through control of the parison.

When a doll head of about 40 mm in height and about 30 mm in width is to be molded, the parison 13 may be generally set to be at dimensions of about 13.5 to 14.5 mm in lateral length, about 15 to 16 mm in anteroposterior length, and about 4 mm in thickness in a lateral direction thereof. Also, a thickness of the prison in the anteroposterior direction thereof is set to be increased by about 10 to 30% and preferably about 20% as compared with the thickness in the lateral direction. Such dimensions of the parison 13 may be suitably varied.

Now, manufacturing of a doll head will be described.

First of all, a molding material is provided, which mainly consists of a thermoplastic synthetic resin elastomer as in the embodiment described above. The molding material may also contain additives such as a plasticizer, a coloring agent and the like, which are added to the elastomer. In the illustrated embodiment, an elastomer material which is commercially available under the tradename "Septone" from KURARAY CO., LTD. may be used for this purpose. Alternatively, a silicone resin material may be substituted for the elastomer.

Figure 15:
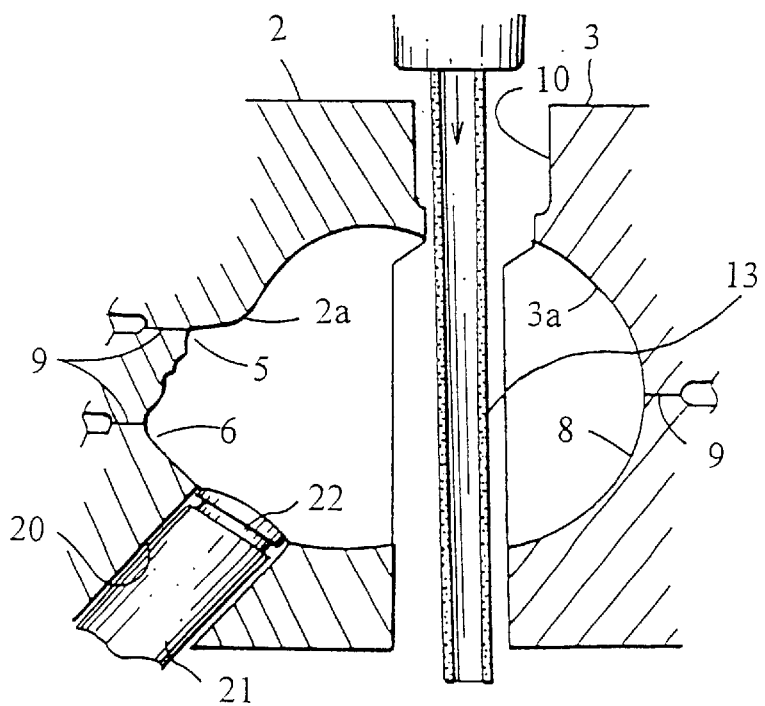
FIG. 15 is a sectional view of the mold in which a parison is advanced.
Figure 16:
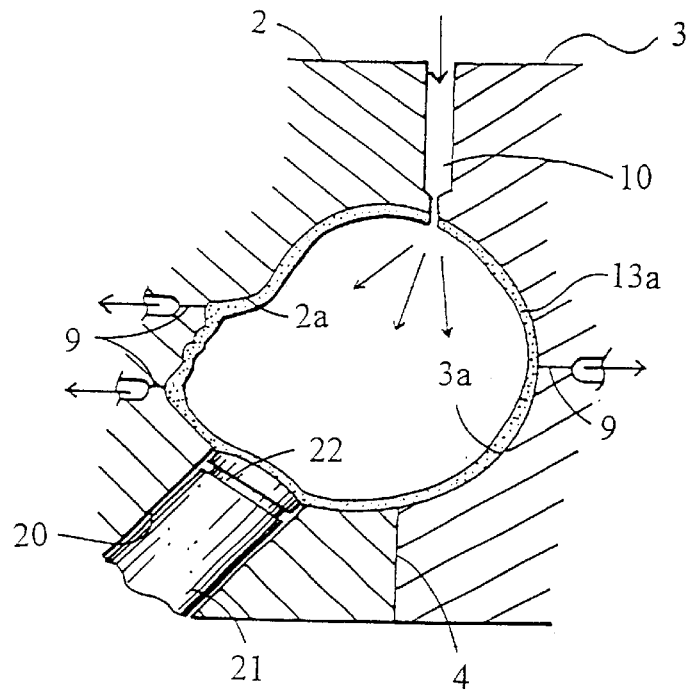
FIG. 16 is a sectional view of the mold into which air is injected.

Then, the above-described molding material is heated and then dropped in the form of the cylindrical parison 13 into a space between the two split mold members 2 and 3 separated from each other as shown in FIGS. 13 and 15. Subsequently, the split mold members 2 and 3 are joined together as shown in FIG. 16 and then air is blown into the mold through the air blowing pipe 17 and air blowing hole 10.

The molding material is heated to a temperature of between 210° C. and 220° C. and the above-described air blowing is carried out under a pressure of between 4 kgf/cm² and 6 kgf/cm². The air blowing leads to expansion of the parison 13, so that the parison 13 may be stuck on the inner surface of the mold 1. Setting of the molding material at a temperature of between 210° C. and 220° C. permits the parison 13 to be uniformly expanded. Removal of a part of air originally present or remaining in the cavity of the mold 1 is carried out through the air vent holes 9 substantially concurrently with the air blowing. This ensures that a molding material 13a is closely contacted with the whole inner surface of the mold 1.

The parison dropped into a space between the split mold members 2 and 3 has a nonuniform thickness and is fed at an additional increased-thickness portion thereof to a portion of the mold 1 apart from the parting line, so that the molding material 13a may be fully fed or distributed in a sufficient amount to portions of the mold corresponding to projections of the doll head such as the nose, the chin, the mouth, the rear head portion and the like, to thereby prevent the projections from being reduced in thickness.

Figure 17:
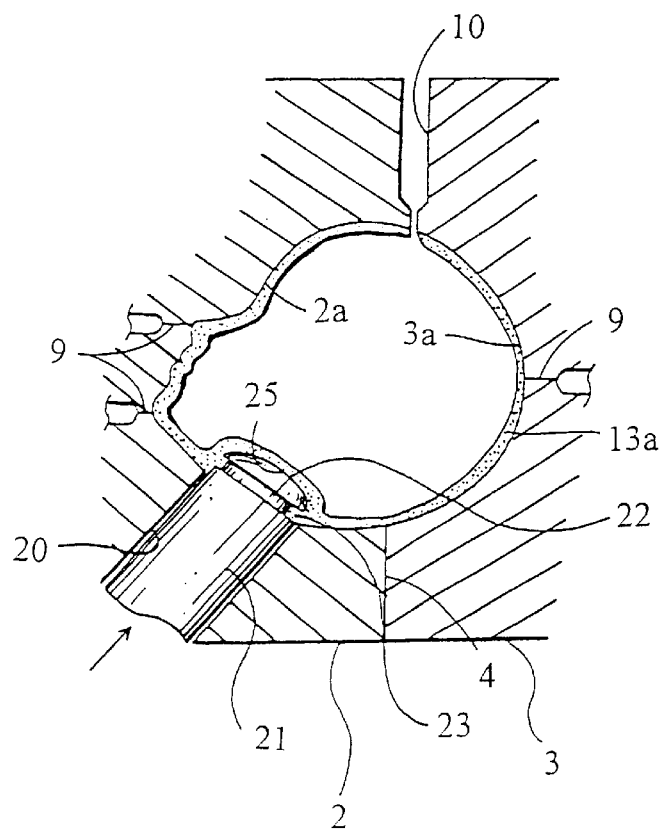
FIG. 17 is a sectional view showing formation of a neck hole.

Then, after blowing of air into the mold 1, the rod 21 is advanced into the cavity of the mold as shown in FIG. 17. Then, the rod 21 is retracted from the mold 1 before separation of the split mold members 2 and 3 from each other. Advancing of the rod 21 permits the molding material 13a to be partially extruded into the mold 1, resulting in a neck hole 25 being formed. Subsequent retraction of the rod 21 leads to formation of a projected ring 23 on a peripheral surface of the neck hole 25.

Figure 18A:
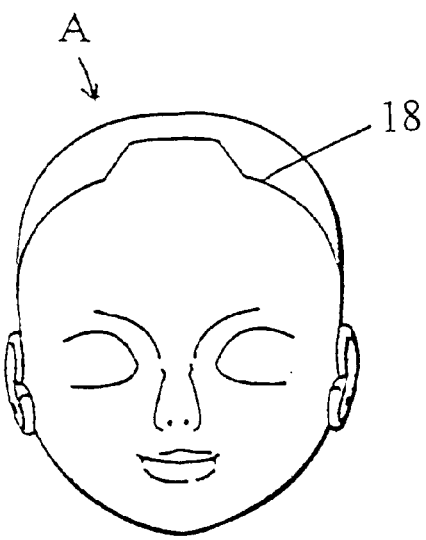
FIGS. 18A and 18B are a front elevation view and a side elevation view each showing a molded doll head, respectively.
Figure 18B:
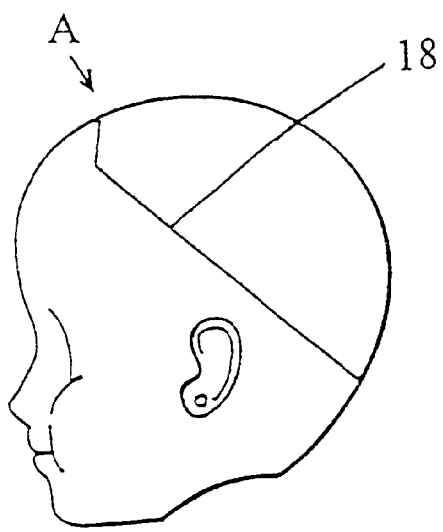

Separation of the split mold members 2 and 3 from each other after full retraction of the rod 21 permits a molded product or doll head A to be dropped from the mold members 2 and 3, resulting in the product or doll head A which exhibits elasticity as shown in FIGS. 18a and 18B being removed therefrom. A parting line 18 is formed on the product so as to extend along a hairline of hair.

Molding of the doll head in the manner described above effectively prevents the parting line 18 from appearing on a face of the doll head which is the most important part of the head, because the one split mold member 2 has the inner surface 2a formed to have a configuration conforming to the face of the doll head and the other mold member 3 has the inner surface 3a formed to have a configuration corresponding to the head portion 8 of the doll head.

The parting line 18 is formed along a hairline of hair or in proximity thereto. However, the head portion 8 is covered with hair or a wig, resulting in the parting line 18 being invisible or out of sight. This eliminates a necessity of subjecting the parting line 18 to any after-treatment.

In the illustrated embodiment, air is outwardly removed from the air vent holes 9 formed at the portions of the mold 1 corresponding to the nose 5, chin 6, ears 7 and head portion 8 substantially simultaneously with the air blowing during the molding, to thereby ensure that the molding material is satisfactorily fed or distributed to the portions. This permits the doll head to be provided with a nose which has a tip and nares formed to have a sharp configuration exactly conforming to the corresponding parts of the mold. Also, the air vent holes 9 are each formed to have a diameter as small as 0.1 mm to 0.3 mm, to thereby prevent the molding material from entering the air vent hole 9, resulting in any useless portion such as a whisker or the like being kept from being formed on the molded product. This eliminates a necessity of subjecting the product to an after-treatment for removing the useless portion. When a doll head of a large size is desired, the air vent holes 9 may each be formed to have a diameter of 0.3 mm or more and such a useless portion as described above may be trimmed by an after-treatment.

The air vent holes 9 are formed so as to be perpendicular to the mating surfaces 4 of the split mold members 2 and 3, so that the air removal may be carried out at enhanced efficiency. Nevertheless, the present invention is not limited to such arrangement of the air vent holes 9.

The illustrated embodiment, as described above, is so constructed that during the molding, the rod 21 is retractably advanced through the cylindrical through-hole 20 of the split mold member 2 to form the neck hole 25, after air is blown into the mold to expand the parison 13. Such construction prevents the neck hole 25 from deteriorating or interfering with molding of the remaining part of the doll head. On the contrary, when the molding is carried out while keeping the rod 21 advanced into the mold 1, the rod 21 interferes with satisfactory distribution of the molding material through the mold 1, to thereby prevent the molding material from being satisfactorily feed to the portions of the mold corresponding to the projections such as the chin and the like.

The rod 21, as described above, is formed on the peripheral surface of the distal end thereof with the ring-like groove 22, so that the neck hole 25 of the doll head A may be formed on a peripheral surface thereof with the annular projection or ring 23. The ring 23 functions to prevent a neck provided on a doll body from being released from the neck hole 25 after the former is fitted in the latter. The groove 22 may be formed to have a helical shape rather than the ring-like shape described above.

Figure 19:
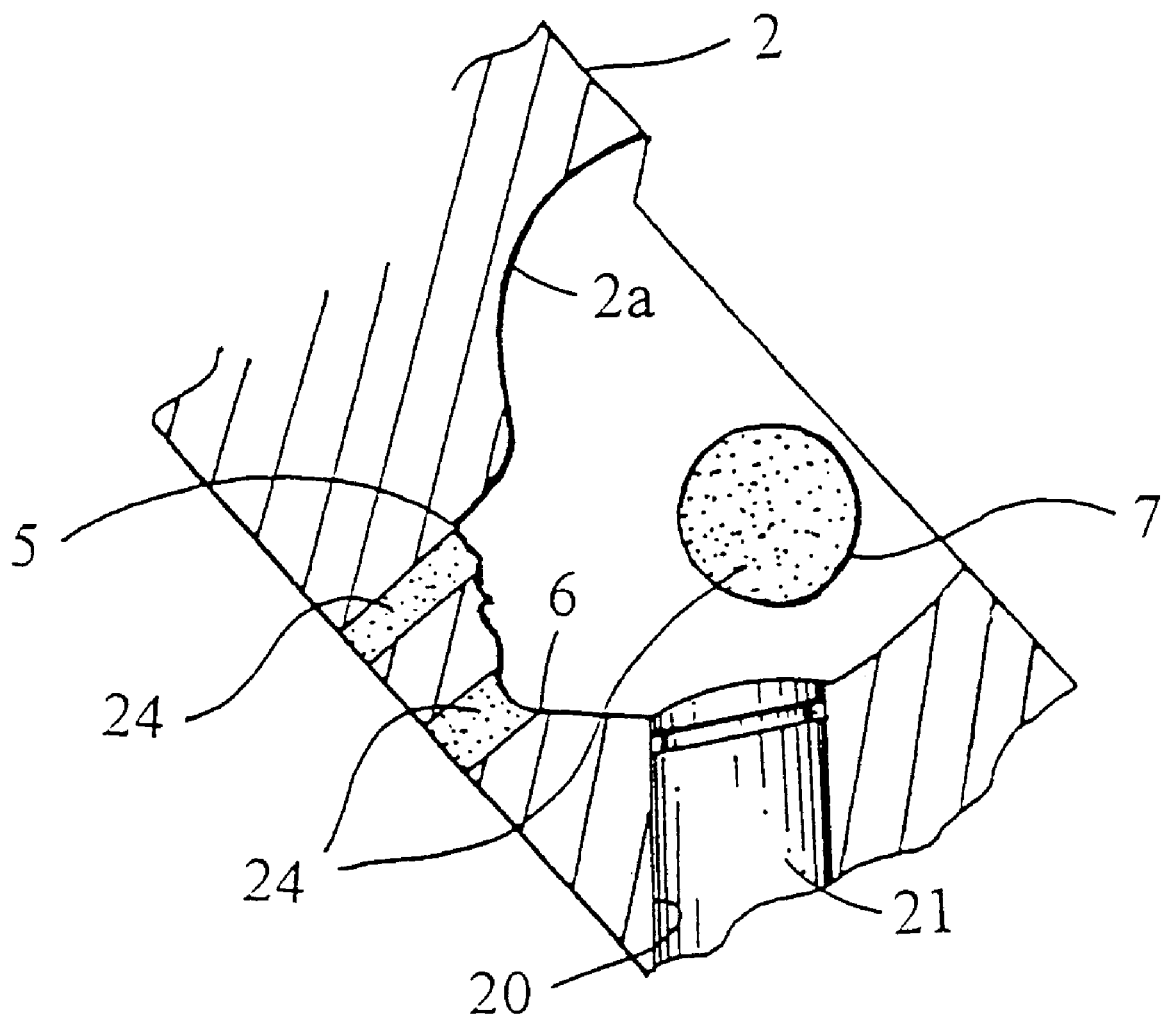
FIG. 19 is a sectional view showing a further embodiment of a mold according to the present invention which is adapted to be used for molding a doll head.

In the illustrated embodiment, the split mold members 2 and 3 are formed with the air vent holes 9 through which the residual air is removed from the cavity of the mold. Alternatively, the illustrated embodiment may be constructed as shown in FIG. 19. More specifically, the split mold member 2(3) has porous members 24 inserted therethrough, which are formed on an end surface thereof facing the cavity to have configurations of the above-described nose and ears 7, respectively. The porous members 24 preferably have pores of 0.03 to 0.1 mm in diameter formed therein.

In the illustrated embodiment, the parison fed into the mold 1 is formed to have a nonuniform thickness, to thereby ensure that the molding material is effectively distributed or fed in a sufficient amount to the portion of the mold apart from the parting line which portion tends to be reduced in thickness when a parison of a conventional shape is used for the molding material. This permits a thickness of the molded doll head to be relatively uniform, to thereby eliminate disadvantages of rendering the doll head transparent and causing only a part of the doll head to be collapsed due to touch by a finger or the like which are encountered with the prior art, resulting in a deterioration in commercial value of the doll head being prevented. Also, in the illustrated embodiment, the parting line defined by the split mold members is formed on the portion of the doll head which does not cause an appearance thereof to be deteriorated, to thereby keep the doll head from being deteriorated in commercial value in spite of blow molding. Further, the rod is retractably moved through the cylindrical through-hole of the split mold member, to thereby form the neck hole after blowing of air for expansion of the parison during the molding, resulting in the neck hole being prevented from interfering with molding of the remaining part of the doll head.

Also, the molding material is free from vinyl chloride, so that the illustrated embodiment does not cause problems relating to environmental pollution, human health and the like, resulting in the molded doll head being harmless to the human body. Further, the doll head exhibits a soft feeling like the human skin. Thus, the doll head of the illustrated embodiment permits a doll suitable for pseudo-experience in play by infants and children to be effectively provided.

Further, the molded product or doll head exhibits elasticity sufficient to permit the product to be smoothly removed from the mold, to thereby effectively prevent damage to undercut portions such as the nose, the chin and the like.

In addition, in the illustrated embodiment, air remaining in the cavity of the mold may be removed therefrom through at least one of the projections corresponding to the nose and the like during blowing of air into the mold, to thereby provide the doll head with a sharp configuration exactly conforming to the mold. This provides the doll head with good appearance and increased aesthetic properties in cooperation with use of the nonuniform-diameter parison.

Moreover, in the illustrated embodiment, production of the nonuniform-diameter parison may be carried out by the nonuniform-diameter die, resulting in it being facilitated while reducing a manufacturing cost.

Figure 20A:
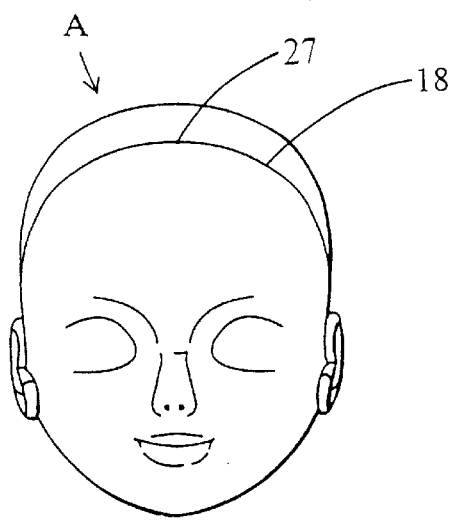
FIGS. 20A, 20B and 20C are a front elevation view, a side elevation view partly in section and a bottom view each showing an elastic doll head according to the present invention.
Figure 20B:
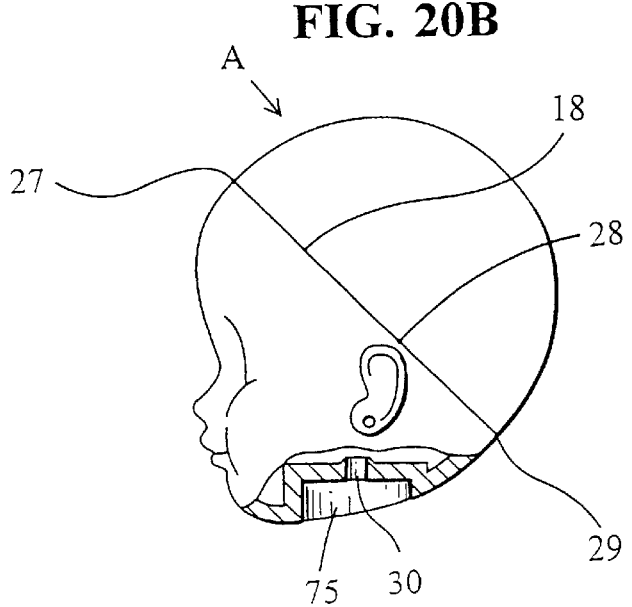
Figure 20C:
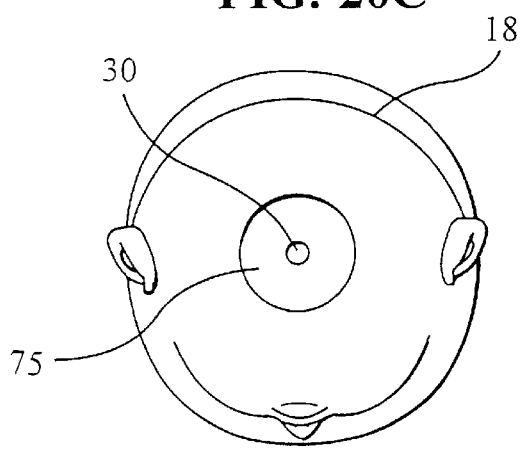

Referring now to FIGS. 20A to 29, a further embodiment of the present invention is illustrated, wherein FIGS. 20A to 20C show an elastic doll head according to the further embodiment of the present invention. A doll head A is made of a thermoplastic olefin elastomer by blow molding as described hereinafter. The head A has a parting line formed thereon so as to extend from an upper portion of a forehead 27 through a rear side 28 of each of ears to a rear portion 29 of a neck. only a neck hole 75 is formed with a through-hole 30. The head including a vertex or head top is free from any hole.

Thus, the doll head A is harmless to the human body of an infant even when. he or she licks it, because it is made of thermoplastic olefin elastomer. Also, waste of the doll head or incineration thereof does not cause generation of harmful substances. Further, the parting line 18 is kept from sight by hair embedded on the head after the molding, so that the doll head is not deteriorated in commercial value even when the parting line 18 is not removed in the subsequent step. Thus, the parting line 18 may be utilized as a guide in the subsequent hair embedding treatment. Further, the head top is free from any hole, to thereby ensure that the hair embedding treatment is smoothly carried out.

In the illustrated embodiment, the molding material is composed of a thermoplastic olefin elastomer. Alternatively, an urethane elastomer may be used for this purpose.

Figure 21:
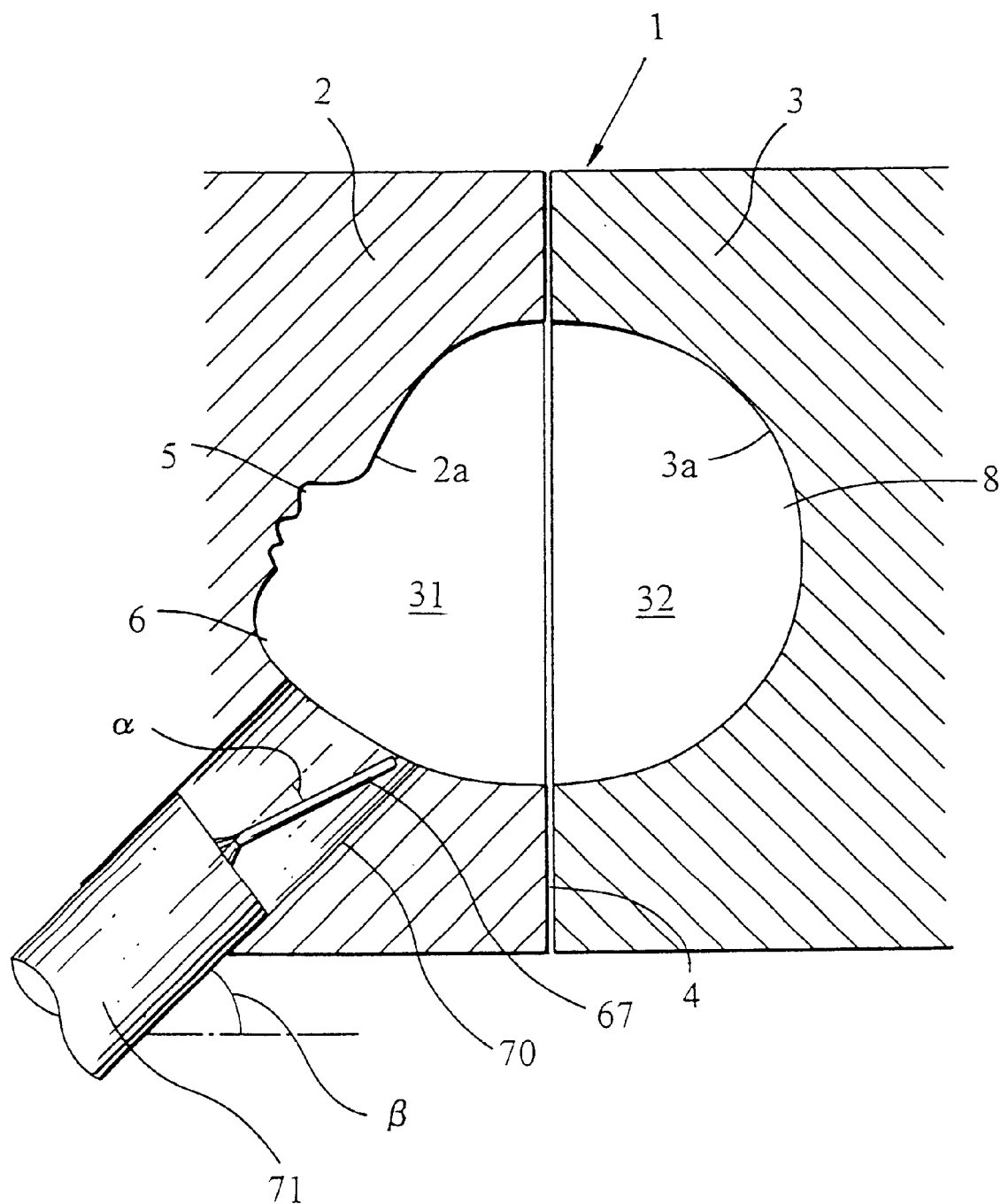
FIG. 21 is a sectional view showing a mold for molding the doll head shown in FIGS. 20A to 20C.

The head doll A may be formed by blow molding in the following manner. More particularly, as shown in FIG. 21, a mold 1 used for the blow molding is constituted by two split mold members 2 and 3. One mold member 2 has an inner surface 2a formed to have a configuration corresponding or conforming to a face of the doll head and the other mold member 3 has an inner surface 3a formed to have a configuration conforming to a head portion of the doll head. The split mold members 2 and 3 of the mold 1 is formed therein with cavities 31 and 32 and mating surfaces 4 so that the elastic doll head A has the parting line 18 formed thereon so as to extend from the upper portion 27 of the forehead through the rear side 28 of each of the ears to the rear portion 29 of the neck. The cavities 31 and 32 of the split mold members 2 and 3 cooperate with each other to form a cavity in the mold when the mold members 2 and 3 are jointed to each other.

The one split mold member 2 is formed at a portion thereof corresponding to the neck hole 75 with a through-hole 70, in which a neck hole forming means 71 is slidably fitted. The neck hole forming means 71 is provided at a distal end thereof with an air injection nozzle 67. The air injection nozzle 67 is connected through the neck hole forming means 71 to an external air feed source (not shown), so that sliding movement of the neck hole forming means 71 permits the air injection nozzle 67 to be retractably advanced into the cavity 31 of the one split mold member 2.

The cavities 31 and 32 of the mold 1 may be formed with small holes for exhausting air present between the molding material and the cavities during formation of the projections such as the ears, nose, mouth and the like as in the embodiment described above. Alternatively, the mold may be made of either a porous material having a number of pores formed therein or a metal material formed to have a breathable structure having a number of fine pores formed therein such as, for example, a material commercially available under the trademark "Porcerax" from SINTOKOGIO, LTD.

Figure 22:
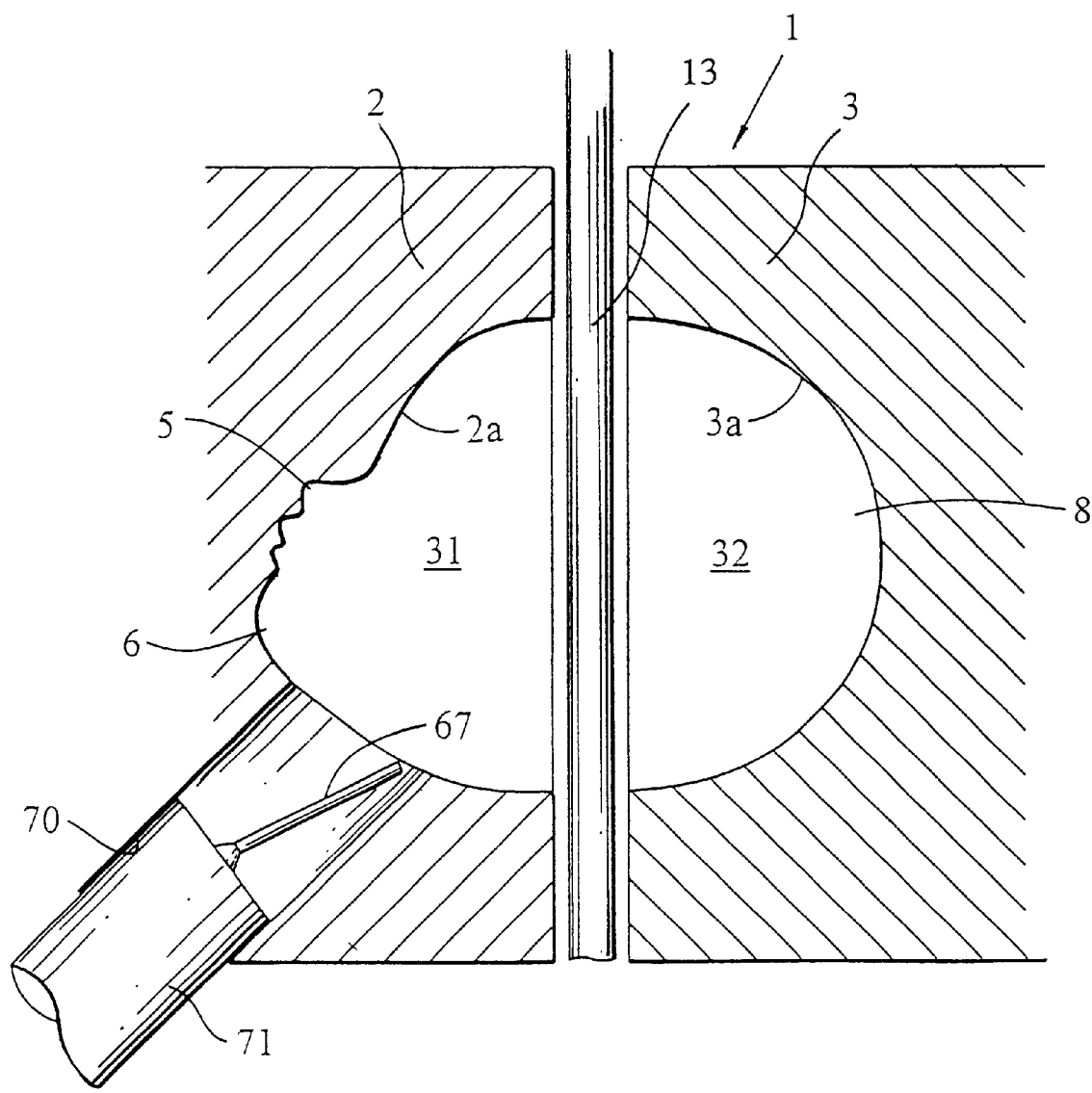
FIG. 22 is a sectional view of the mold in which a parison is advanced.
Figure 23:
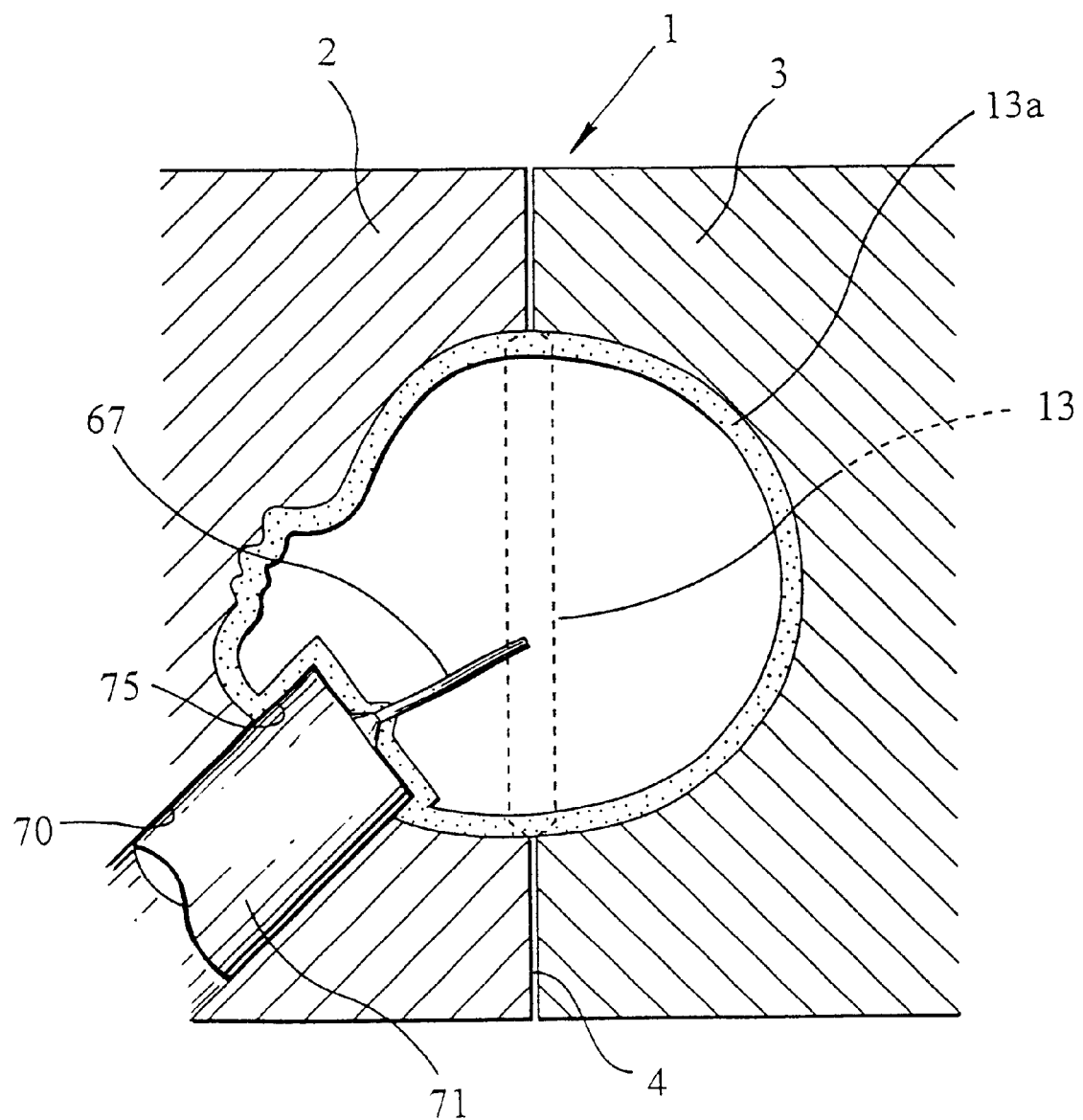
FIG. 23 is a sectional view of the mold into which air is injected.

For molding of the doll head A, the parison 13 is prepared by forming a thermoplastic elastomer for the molding material 13a into a cylindrical shape. Then, the parison 13 thus formed is downwardly advanced into a space between the split mold members 2 and 3 separated from each other as shown in FIG. 22 and then the mold members 2 and 3 are joined together as shown in FIG. 23. Then, the neck hole forming means 71 is advanced via the through-hole 70 to form a part of an inner surface of the mold for molding the neck hole 75 and the air injection nozzle 67 is advanced into the cavity of the mold until it is inserted at a distal end into the parison 13. Then, air is injected into the parison 13 through the air injection nozzle 67. This permits the molding material 13a to be expanded, to thereby be stuck on an inner surface of the cavities 31 and 32 of the split mold members 2 and 3. After the molding material is cooled, the mold members 2 and 3 are separated from each other and the molded product or doll head A is taken out therefrom. In this instance, the neck hole forming means 71 is retracted just before separation of the mold members 2 and 3, to thereby retract the air injection nozzle 67 from the neck hole 75, resulting in the hole 30 being formed.

The neck hole 75 formed by the neck hole forming means 71 has a diameter of about 10 mm and the injection nozzle 10 is positioned at a center of the neck hole 75 during the molding. In this instance, when the injection nozzle 67 is deviated from the center as described above or angles described below are excessively acute or obtuse, the hole 30 (FIG. 20) is caused to be dislocated or deformed. Of course the hole 30 may be subjected to an after-processing. However, in this instance, integral molding of the doll head cannot be carried out. The injection nozzle 67 may be generally formed to have a diameter of about 2 mm although it is not limited to such a size. The injection nozzle 67 is preferably arranged so as to be perpendicular to the parison as much as possible. In general, the injection nozzle 67, as shown in FIG. 21, is preferably arranged so that an angle α between the nozzle and an axis of the through-hole 70 is set to be between 15° and 25° and preferably 20° and an angle β between the axis of the through-hole 70 and a horizontal direction is set to be between 40° and 50° and preferably 45°.

The above-described blow molding provides the doll head A shown in FIG. 20. The parting line 18 is formed so as to extend from the upper portion 27 of the forehead of the doll head A through the rear side 28 of each of the ears to the rear portion 29 of the neck. In the molded doll head A, only the neck hole 75 is formed with the hole 30 when the air injection nozzle 67 is detached from the mold. However, the head including the head top is free from any hole. The hole 30 may act as an engagement hole in which a neck provided on an upper portion of a doll body is fittedly engaged. A size of the hole 30 may be adjusted by after-processing using a drill or the like.

When formation of a doll head having a height of about 40 mm and a width of about 30 mm is desired in the blow molding described above, a molding temperature of the thermoplastic olefin elastomer is set to be between 130° C. and 170° C. and an air injection pressure is set to be between 4 kgf/cm$^2$ and 5 kgf/cm$^2$. Also, the die for extruding the molding material in the form of the parison 13 is formed to have a diameter of between 14 mm and 15 mm and the nozzle arranged at the center of the die is formed to have a diameter of 9 mm. Thus, the parison 13 is formed to have a diameter of between 14 mm and 15 mm and a thickness of 2.5 mm and 3 mm.

Figure 24A:
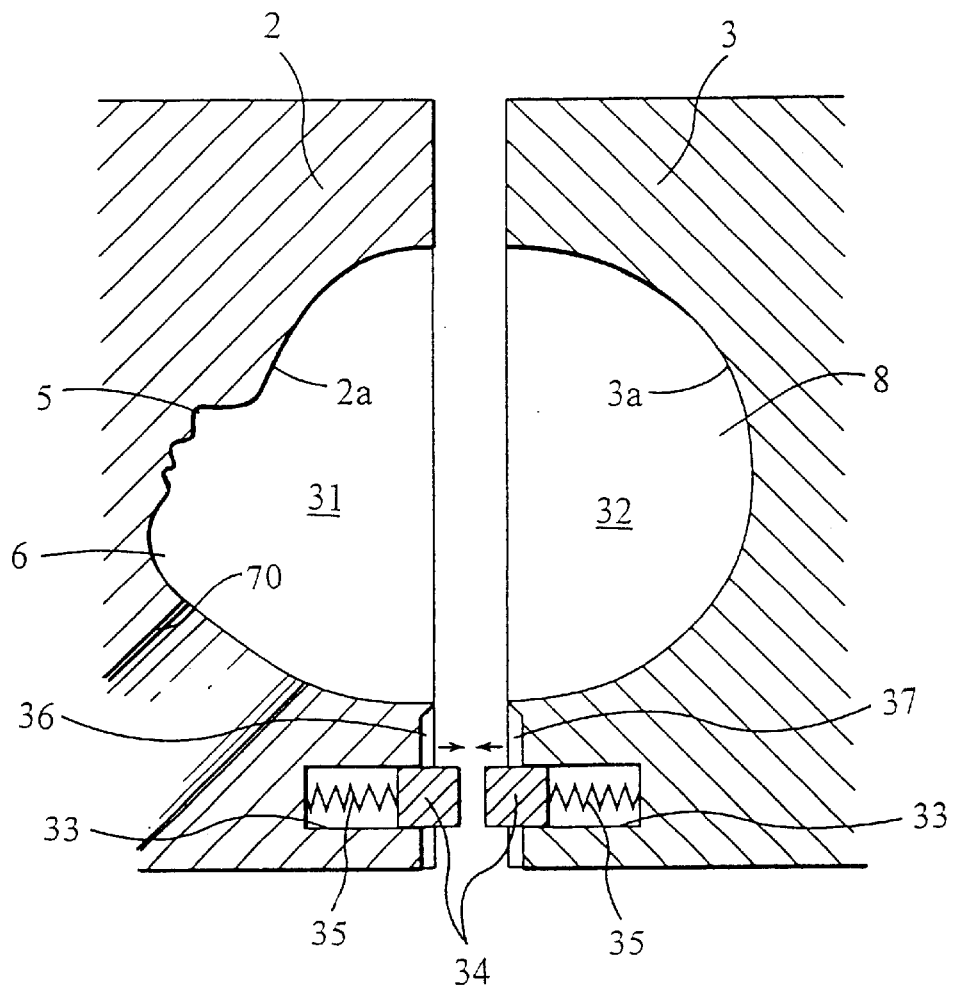
FIGS. 24A and 24B are a vertical sectional view showing still another embodiment of a mold according to the present invention and a cross sectional view showing an essential part of the mold, respectively.
Figure 24B:
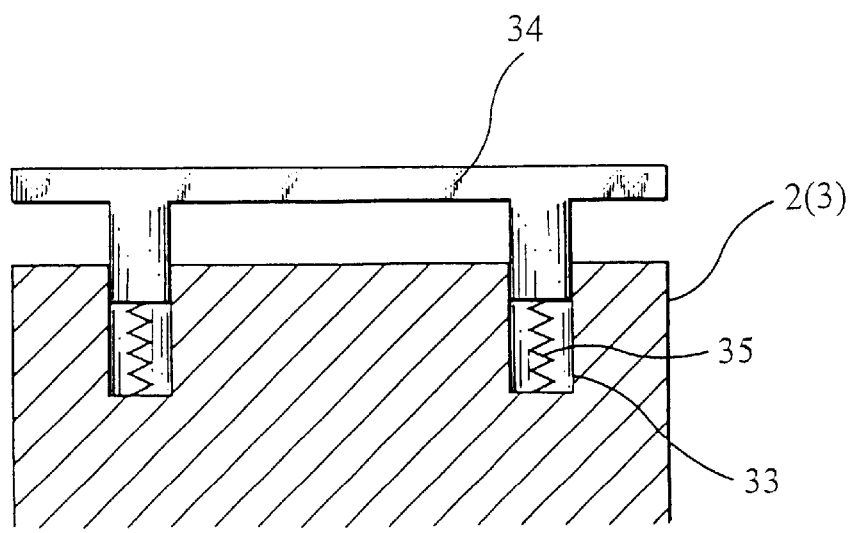

Pre-blowing preferably takes place in the blow molding described above. For this purpose, as shown in FIGS. 24A and 24B, the split mold members 2 and 3 are each formed at a portion thereof positioned below each of the cavities 31 and 32 with a recess 33 so as to extend in a direction perpendicular to the mating surface thereof. The recesses 33 each have a pre-pinch member 34 for pre-blowing mounted therein. Also, the recesses 33 each have a spring 35 arranged therein, which functions to urge the pre-pinch member 34 in a direction in which the pre-pinch member 34 is projected from the mating surface.

Also, molding spaces 36 and 37 are formed between the pre-pinch members 34 of the split mold members 2 and 3 and the cavities 31 and 32 for molding of the doll head, respectively, resulting in an additional increased-thickness portion 38 which is connected through a reduced-thickness portion 39 to the parting line 18 being provided.

Figure 25:
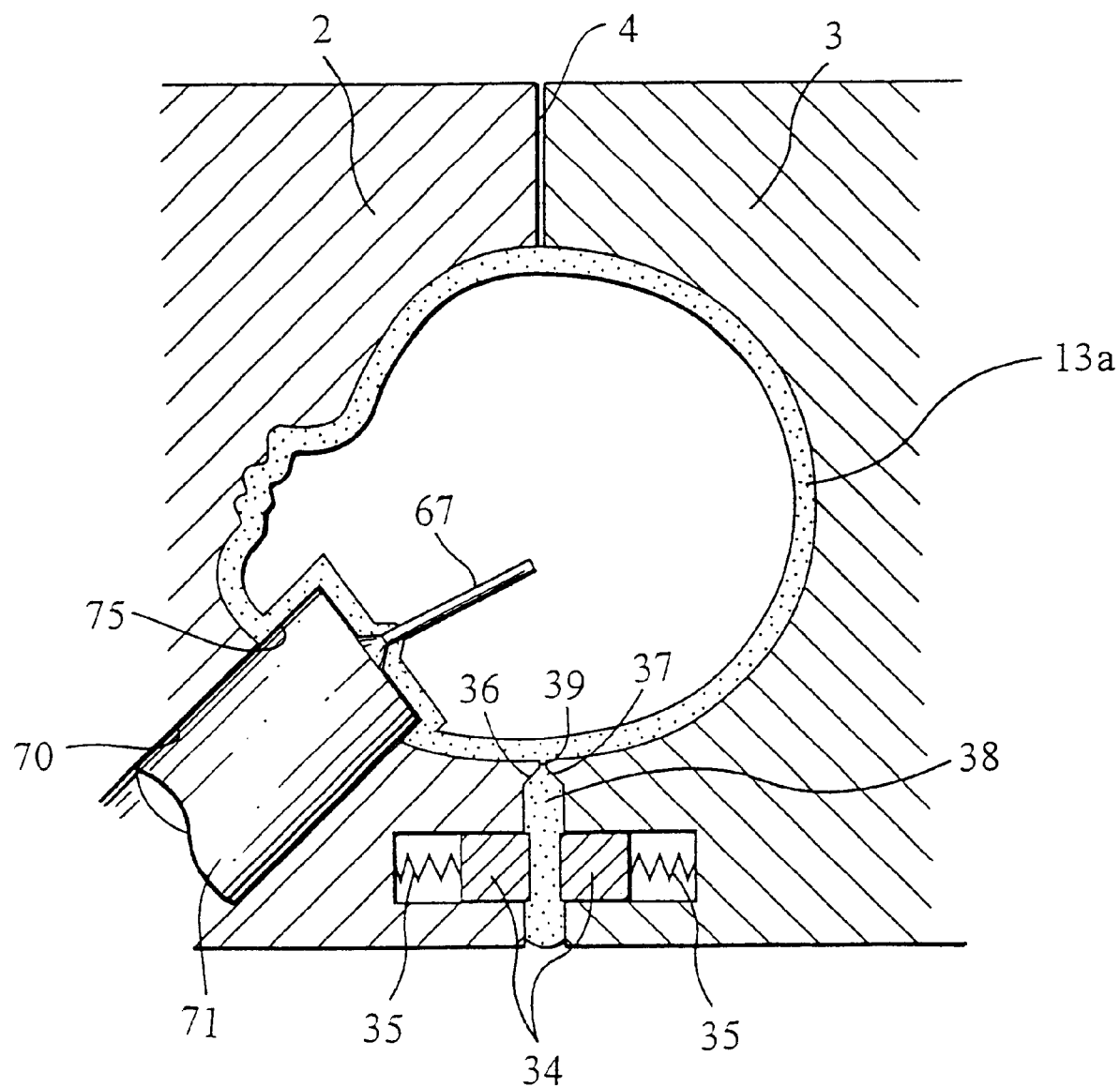
FIG. 25 is a sectional view of the mold into which air is blown after closing of the mold.
Figure 26:
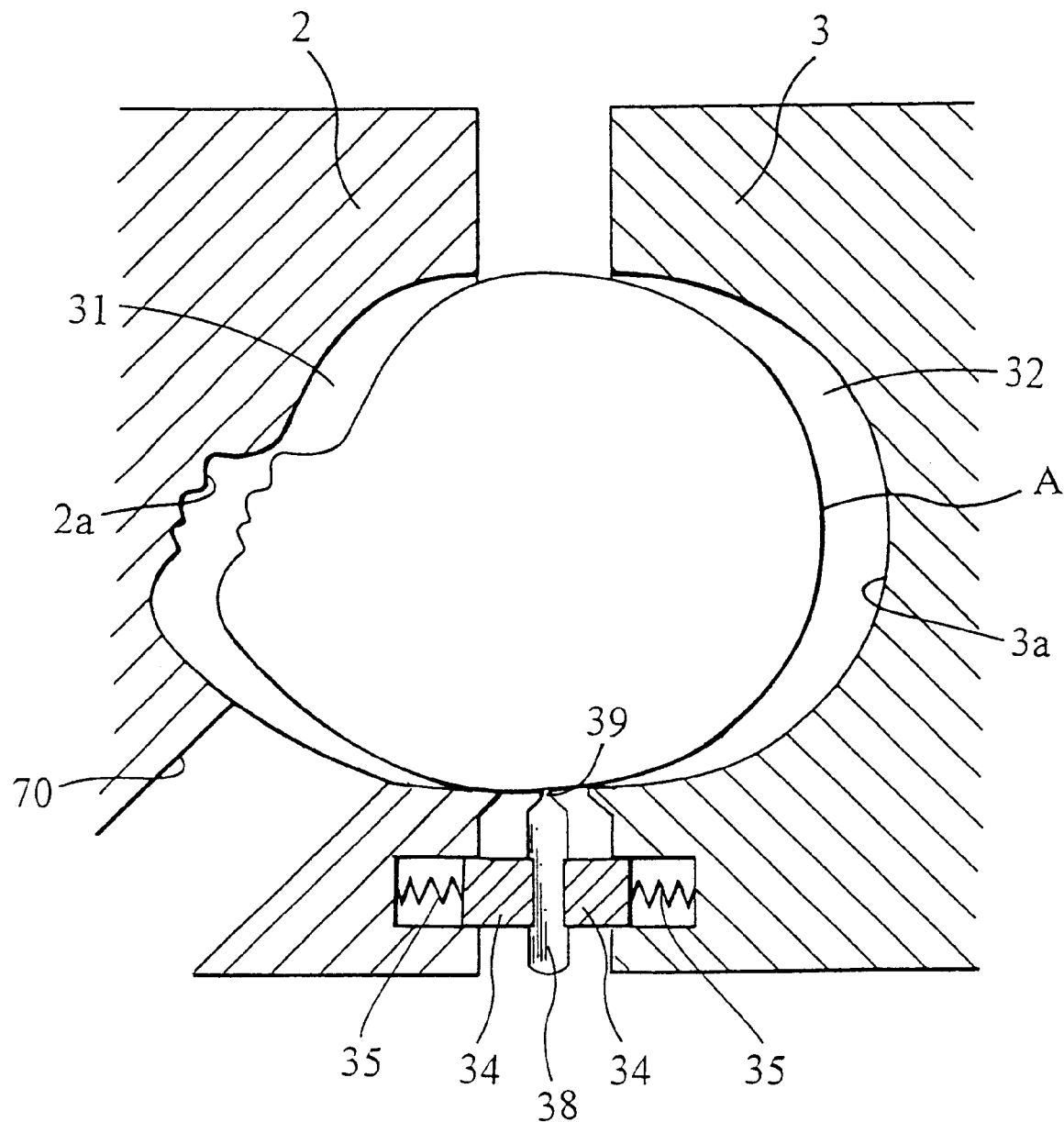
FIG. 26 is a sectional view of the mold which is open.

The above-described construction, as shown in FIG. 25, permits the molding material to be fed to the molding spaces 36 and 37 as well, to thereby form the additional increased-thickness portion 38, when the split mold members 2 and 3 are joined together for the molding. The pre-pinch members 34 in the mold members 2 and 3 are abutted against the additional increased-thickness portion 38 of the molding material 13a in directions opposite to each other, to thereby be forced into the mold members against elastic force of the springs 35. After the molding, the mold members 2 and 3 are permitted to be immediately separated from each other with ease. However, the pre-pinch members 34 are forced against each other until they are released from pressing force of the springs 35, so that the additional increased-thickness portion 38 interposed between the pre-pinch members 34 is still held at a position as determined before separation of the mold members 2 and 3. This permits the doll head A molded in the cavities 31 and 32 to be likewise held at a position as molded in spite of movement of the mold members 2 and 3 due to separation thereof from each other. Thus, the molded product A in the mold members 2 and 3 may be removed therefrom through the additional increased-thickness portion 38. This permits the molded product to be readily taken out from the mold members 2 and 3 upon separation of the mold members from each other, to thereby eliminate a problem that the molded product A is left in any one of the mold members 2 and 3. The additional increased-thickness portion 38 is connected through the reduced-thickness portion 39 of the parting line 18 to the molded product A, so that pulling of the additional increased-thickness portion 38 permits it to be readily separated or released from the product A after the molding.

Figure 27:
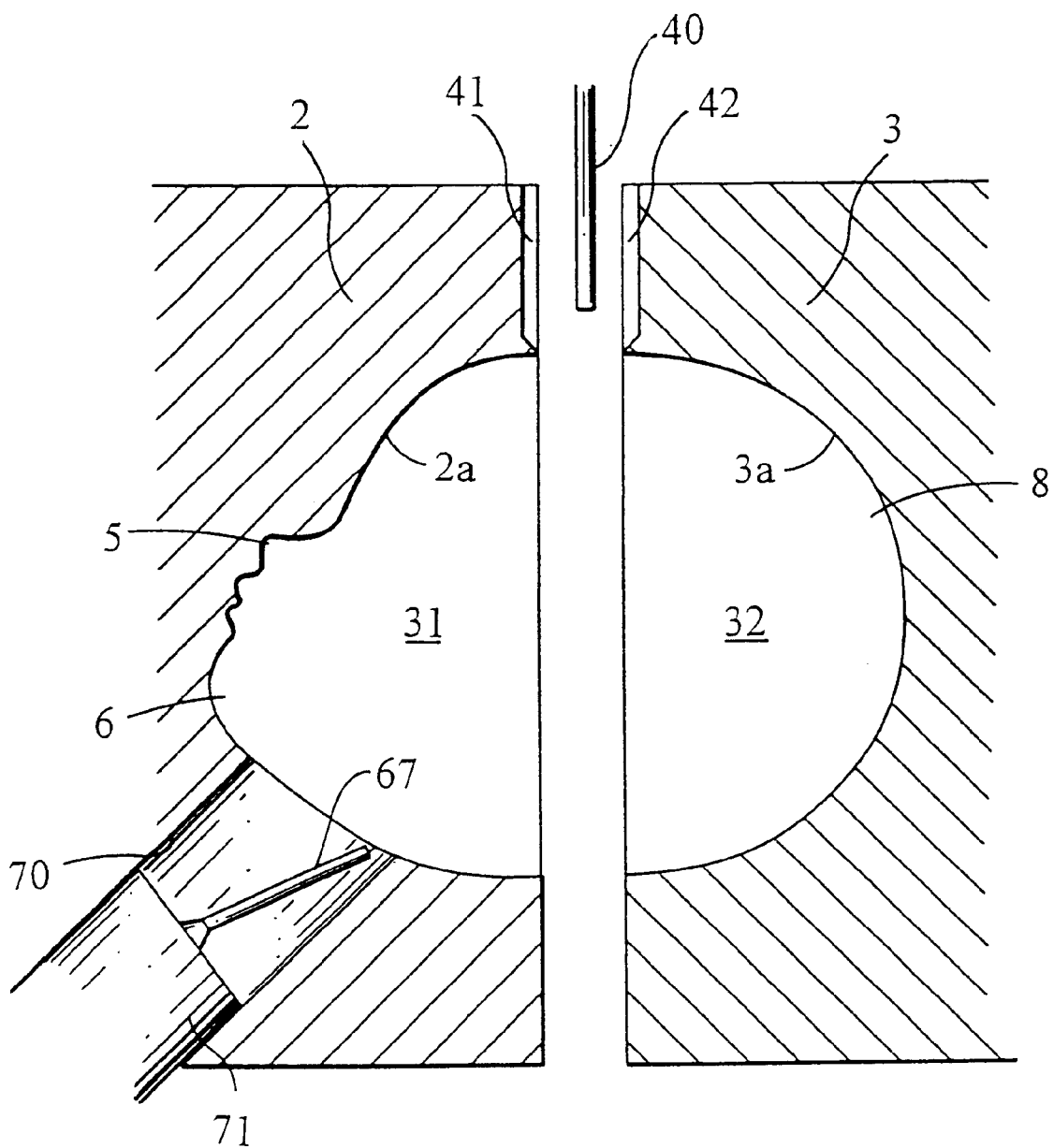
FIG. 27 is a sectional view showing yet another embodiment of a mold according to the present invention.
Figure 28:
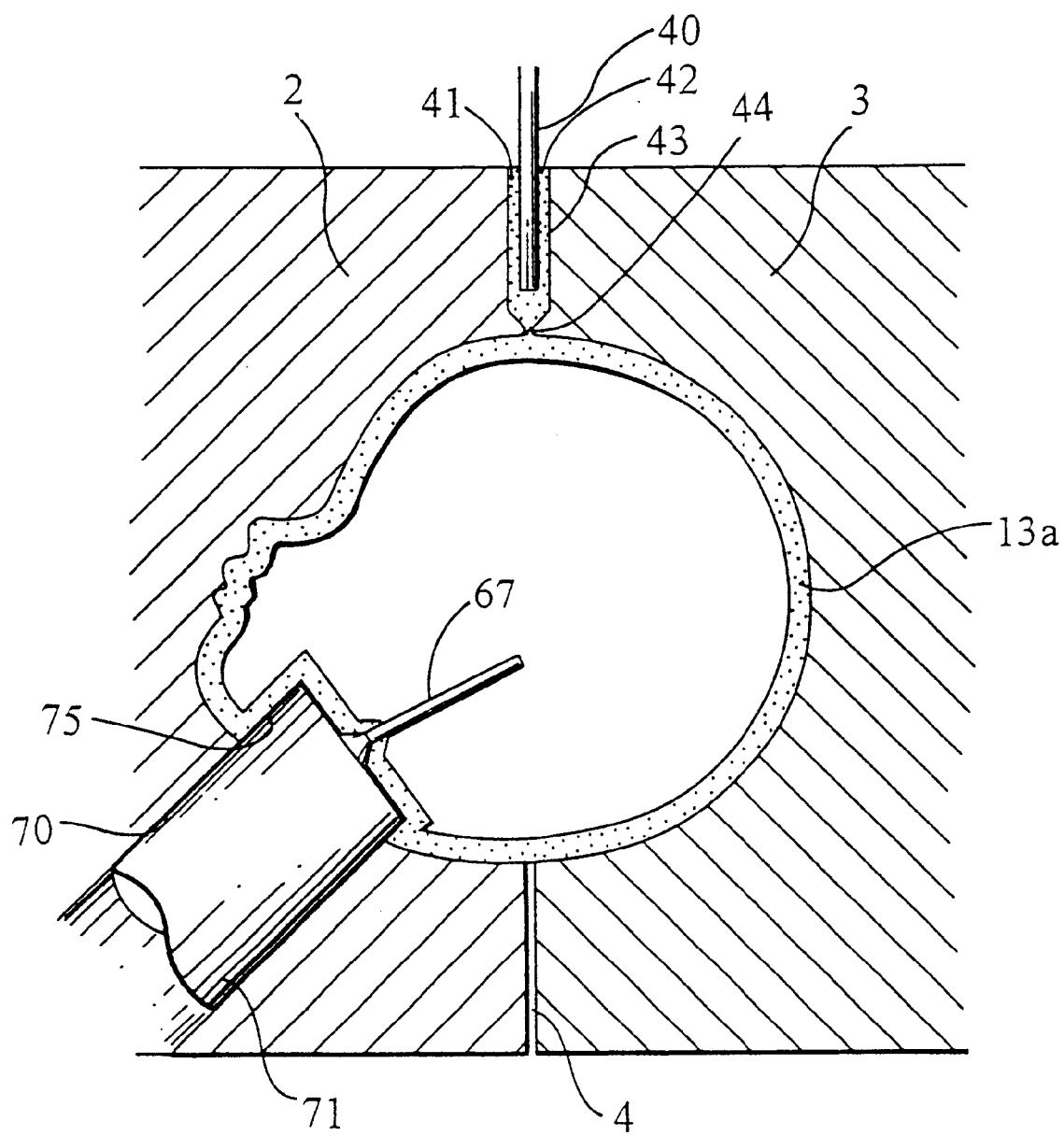
FIG. 28 is a sectional view of the mold shown in FIG. 27 which is closed.
Figure 29:
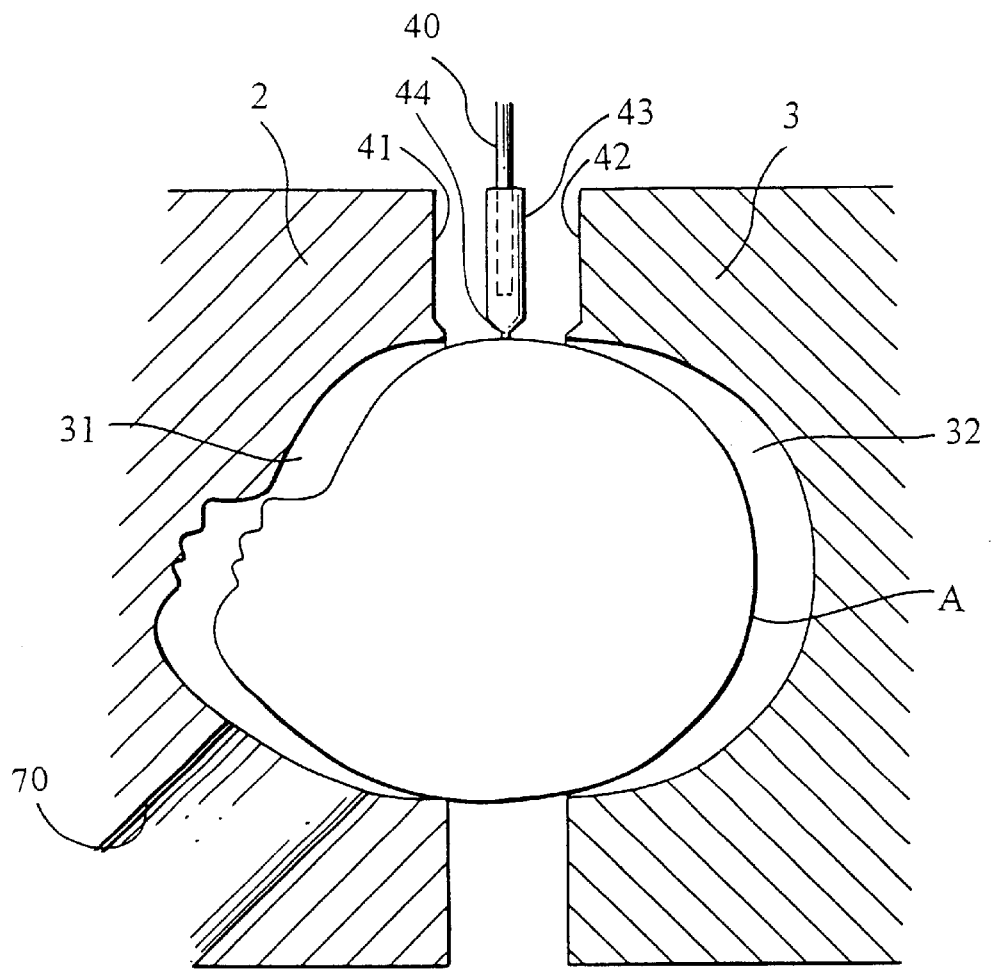
FIG. 29 is a sectional view of the mold shown in FIG. 27 which is open.
Figure 30:
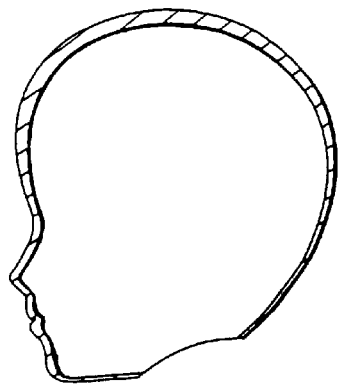
FIG. 30 is a vertical sectional view showing a doll head molded by conventional blow molding.

Alternatively, removal of the molded product A from the split mold members 2 and 3 may be carried out using a means constructed as shown in FIG. 27. More particularly, a stationary pin 40 is arranged between the split mold members 2 and 3 and molding spaces 41 and 42 for an additional increased-thickness portion are formed at a portion of the mold members 2 and 3 corresponding to the stationary pin 40 in substantially the same manner as described above. Then, as shown in FIG. 28, the split mold members 2 and 3 are joined to each other for the molding, so that the molding spaces 41 and 42 may be effectively filled with the molding material as well, to thereby provide an additional increased-thickness portion 43. Concurrently, the stationary pin 40 is embedded in the additional increased-thickness portion 43. Then, when the split mold members 2 and 3 are separated from each other, the stationary pin 40 is kept stationary between the split mold members 2 and 3, so that the molded product A connected to the additional increased-thickness portion 43 may be likewise held at an intermediate portion. Then, the molded product A in the split mold members 2 and 3 is pulled out therefrom, so that the molded product A may be positively removed from the mold members 2 and 3 upon separation thereof, resulting in a problem that the molded product A is left in any one of the mold members 2 and 3 being effectively eliminated. The additional increased-thickness portion 43 is connected through a reduced-thickness portion 44 of the parting line to the molded product A, so that pulling of the additional increased-thickness portion 43 permits it to be readily separated from the molded product A.

In general, the stationary pin 40 may be constituted by an air blowing pipe arranged at a center of a conventional die for extruding the molding material.

As described above, removal of the molded product from the mold may be carried out by means of the pre-pinch members for pre-blowing and the stationary pin. Actually the removal may be satisfactorily carried out by only one of these means, thus, it is not required to employ a combination of both means. Nevertheless, the combination may be of course used for this purpose, as required.

In the illustrated embodiment, the parting line is covered with hair embedded on the doll head after the molding, to thereby be kept from being exposed, so that the doll head is not deteriorated in commercial value even when the parting line is not removed. Also, the hole formed during the blow molding is left in only the neck hole of the head and no hole is formed at the head portion including the head top, resulting in an appearance of the doll head being kept from being deteriorated and ensuring that embedding of hair on the head is smoothly carried out. Also, the hole may be used as an engagement hole for engaging the doll head with a doll body, to thereby eliminate a necessity of separately forming a specific engagement hole.

In particular, in the illustrated embodiment, blow molding is carried out by injecting air into the mold through the air injection nozzle of the neck hole forming means arranged at one of the split mold members. Such construction prevents any hole from being formed at the head portion of the head including the head top. Also, the parting line is formed so as to extend from the upper portion of the forehead through the rear side of each of the ears to the rear portion of the neck. Further, the air injection nozzle is retractably arranged, to thereby be kept from interfering with a treatment carried out subsequent to the molding. Also, the engagement hole through which the doll head is engaged with the doll body is integrally formed at the doll head, to thereby eliminate operation of separately forming any specific engagement hole, leading to an increase in manufacturing efficiency.

Further, the illustrated embodiment permits the doll head to be made of a thermoplastic elastomer, so that it is harmless to the body of an infant even if he or she licks it. In addition, waste of a doll including the doll head or incineration thereof does not cause generation of any harmful substance.

In the illustrated embodiment, pre-blowing may take place during the blow molding, so that the molded product may be positively released from the mold by means of the pre-pinch members when the split mold members are separated from each other after the molding, resulting in the molded product being kept from being left in any one of the mold members.

Moreover, the illustrated embodiment may be so constructed that the stationary pin arranged between the split mold members is embedded in the additional increased-thickness portion during the molding. This permits the molded product to be released from the mold by the additional increased-thickness portion when the split mold members are separated from each other, to thereby be more positively removed from the mold without being left in any one of the split mold members.

What is claimed is:

1. A method for forming an elastic doll head, characterized in that the method comprises the steps of:

providing split mold members each having an inner surface formed to have a configuration which provides a shape of the doll head when said split mold members cooperate with each other, said split mold members forming the doll head with a parting line through which the doll head is substantially equally divided into two halves;

heating a molding material mainly consisting of one selected from the group consisting of a thermoplastic synthetic resin elastomer and a silicone resin material, dropping the molding material in the form of a parison into a space defined between said split mold members kept spaced from each other, joining said split mold members to each other, and blowing air into said split mold members thus joined; and separating said split mold members from each other to remove the molded doll head from said split mold members;

said split mold members each being formed with a cavity and a mating surface so that said parting line is formed on the doll head so as to extend from an upper portion of a forehead of the doll head through a rear side of each of ears thereof to a rear portion of a neck thereof;

one of said split mold members being formed with a neck hole forming means in a manner to be retractably advanced into said cavity;

said neck hole forming means being formed with an air injection nozzle for injecting air into said cavities of said split mold members, resulting in blow molding being carried out.

2. A method for forming an elastic doll head, characterized in that the method comprises the steps of:

providing split mold members each having an inner surface formed to have a configuration which provides a shape of the doll head when said split mold members cooperate with each other, said split mold members forming the doll head with a parting line through which the doll head is substantially equally divided into two halves;

heating a molding material mainly consisting of one selected from the group consisting of a thermoplastic synthetic resin elastomer and a silicone resin material, dropping the molding material in the form of a parison into a space between said split mold members kept spaced from each other, joining said split mold members to each other, and blowing air into said split mold members thus joined; and separating said split mold members from each other to remove the molded doll head from said split mold members;

said split mold members each being formed with a cavity and a mating surface so that said parting line has a portion associated with each of ears of the doll head in a manner to extend along an outer edge of the ear.

3. A method for forming an elastic doll head as defined in claim 1, wherein said air injection nozzle forms the doll head with a hole which acts as an engagement hole through which the doll head is engaged with a doll body.

4. A method for forming an elastic doll head as defined in claim 1, wherein pre-blowing is carried out during said blow molding.

5. A method for forming an elastic doll head as defined in claim 1, wherein a stationary pin is arranged between said split mold members;

said split mold members are each formed at a portion thereof corresponding to said stationary pin with a molding space for formation of an additional increased-thickness portion; and said stationary pin is embedded in the additional increased-thickness portion which said molding space is filled with during molding of the doll head.

6. A method for forming an elastic doll head as defined in claim 1, wherein air in said cavities of said split mold members is removed through at least one of projections provided on said doll head when air is injected into said split mold members.

7. A method for forming an elastic doll head as defined in claim 1, wherein said split mold members are each formed of a porous metal material into a breathable structure including a number of fine pores as a whole.

8. A method for forming an elastic doll head as defined in claim 1, wherein said parison is formed to have a nonuniform thickness.

9. A method for forming an elastic doll head as defined in claim 8, wherein said parison is formed to be nonuniform in thickness in cross section.

10. A method for forming an elastic doll head as defined in claim 8, wherein said parison is formed to be nonuniform in thickness in vertical section.

11. A method for forming an elastic doll head as defined in claim 10, wherein said parison is formed to be nonuniform in thickness in both cross section and vertical section.

12. A method for forming an elastic doll head as defined in claim 10, wherein said parison is formed by means of a die of a nonuniform diameter.

13. A method for forming an elastic doll head as defined in claim 2, wherein air in said cavities of said split mold members is removed through at least one of projections provided on said doll head when air is injected into said split mold members.

14. A method for forming an elastic doll head as defined in claim 2, wherein said split mold members are each formed of a porous metal material into a breathable structure including a number of find pores as a whole.

15. A method for forming an elastic doll head as defined in claim 2, wherein said parison is formed to have a nonuniform thickness.

16. A method for forming an elastic doll head, characterized in that the method comprises the steps of:

providing split mold members each having an inner surface formed to have a configuration which provides a shape of the doll head when said split mold members cooperate with each other, said split mold members forming the doll head with a parting line through which the doll head is substantially equally divided into two halves;

heating a molding material mainly consisting of one selected from the group consisting of a thermoplastic synthetic resin elastomer and a silicone resin material, dropping the molding material in the form of a parison into a space between said split mold members kept spaced from each other, joining said split mold members to each other, and blowing air into said split mold members thus joined; and separating said split mold members from each other to remove the thus-molded doll head from said split mold members;

said parison being formed to have a nonuniform thickness.

17. A method for forming an elastic doll head as defined in claim 3, wherein air in-said cavities of said split mold members is removed through at least one of projections provided on said doll head when air is injected into said split mold members.

18. A method for forming an elastic doll head as defined in claim 3, wherein said parison is formed to be nonuniform in thickness in cross section.

19. A method for forming an elastic doll head as defined in claim 3, wherein said parison is formed to be nonuniform in thickness in vertical section.

20. A method for forming an elastic doll head as defined in claim 3, wherein said parison is formed to be nonuniform in thickness in both cross section and vertical section.

21. A method for forming an elastic doll head as defined in claim 3, wherein said parison is formed by means of a die of a nonuniform diameter.

22. A method for forming an elastic doll head as defined in claim 3, wherein the parting line formed by said split mold members is formed at a position which prevents the parting line from deteriorating an appearance of the doll head.

23. A method for forming an elastic doll head as defined in claim 3, wherein said split mold members are provided at a portion thereof corresponding to a neck of the doll head with a rod in a manner to be retractably advanced into the cavity; and said rod is advanced into the cavity after injection of air and retracted from the cavity before separation of the split mold members.

24. A method for forming an elastic doll head as defined in claim 3, wherein said split mold members are each formed of a porous metal material into a breathable structure including a number of find pores as a whole.

25. An elastic doll head characterized in that the doll head is made of a molding material mainly consisting of one selected from the group consisting of a thermoplastic synthetic resin elastomer and a silicone resin material by blow molding and formed thereon with a parting line which extends from an upper portion of a forehead of the doll head through a rear side of each of ears thereof to a rear portion of a neck thereof;

wherein said neck has a hole formed therein during blow molding.

26. An elastic doll head as defined in claim 25, wherein said hole acts as an engagement hole for engaging the doll head with a doll body therethrough.

27. An elastic doll head characterized in that the doll head is made of a molding material mainly consisting of one selected from the group consisting of a thermoplastic synthetic resin elastomer and a silicone resin material by blow molding and formed thereon with a parting line which substantially equally divides the doll head into two halves in a longitudinal direction thereof;

wherein said parting line has a portion associated with each of ears of the doll head in a manner to extend along an outer edge of the ear.

28. An elastic doll head as defined in claim 23, wherein said doll head is formed with a neck hole; and said parting line is formed so as to extend along a lower surface of a chin of the doll head from below the outer edge of each of the ears and pass around a front portion of the neck hole.

29. An elastic doll head as defined in claim 24, wherein the doll head is formed to have dimensions of about 40 mm in height, about 30 mm in width and about 4 mm in length between an open end of said neck hole and a step behind the open end.

30. A mold for forming a molding material mainly consisting of one selected from the group consisting of a thermoplastic synthetic resin elastomer and a silicone resin material into an elastic doll head by blow molding, characterized in that the mold comprises:

a pair of split mold members each having an inner surface formed with a cavity and a mating surface so as to form a parting line when said split mold members cooperate with each other, said parting line being formed so as to extend from an upper portion of a forehead of the doll head through a rear side of each of ears thereof to a rear portion of a neck thereof;

one of said split mold members being formed at a portion thereof corresponding to a neck of the doll head with a throughhole, said through-hole having a neck hole forming means slidably fitted therein, said neck hole forming means being provided at a distal end thereof with an air injection nozzle.

31. A mold for forming an elastic doll head as defined in claim 30, wherein said split mold members are each mounted therein with a pre-pinch member for pre-blowing, said pre-pinch member being urged in a direction in which it projects from said mating surface by means of a spring; and a molding space is defined between the pre-pinch member of each of said split mold members and said cavity thereof for forming an additional increased-thickness portion connected to said parting line through a reduced-thickness portion.

32. A mold for forming an elastic doll head as defined in claim 22, wherein a stationary pin is arranged between said split mold members; and said split mold members are each formed at a portion thereof corresponding to said stationary pin with a molding space for forming an additional increased-thickness portion.

* * * * *